United States Patent
Karkow et al.

(10) Patent No.: US 9,562,682 B2
(45) Date of Patent: Feb. 7, 2017

(54) BURNER WITH A SERIES OF FUEL GAS EJECTORS AND A PERFORATED FLAME HOLDER

(71) Applicant: ClearSign Combustion Corporation, Seattle, WA (US)

(72) Inventors: Douglas W. Karkow, Des Moines, WA (US); Robert Breidenthal, Seattle, WA (US); Joseph Colannino, Bellevue, WA (US); Christopher A. Wiklof, Everett, WA (US)

(73) Assignee: CLEARSIGN COMBUSTION CORPORATION, Seattle, WA (US)

( * ) Notice: Subject to any disclaimer, the term of this patent is extended or adjusted under 35 U.S.C. 154(b) by 0 days.

(21) Appl. No.: 14/741,098

(22) Filed: Jun. 16, 2015

(65) Prior Publication Data
US 2015/0285491 A1    Oct. 8, 2015

Related U.S. Application Data

(63) Continuation-in-part of application No. PCT/US2014/016632, filed on Feb. 14, 2014.
(Continued)

(51) Int. Cl.
*F23C 6/04* (2006.01)
*F23C 99/00* (2006.01)
(Continued)

(52) U.S. Cl.
CPC ............. *F23C 99/001* (2013.01); *F23C 6/042* (2013.01); *F23C 9/06* (2013.01); *F23D 11/02* (2013.01);
(Continued)

(58) Field of Classification Search
CPC .......... F23D 14/10; F23D 14/14; F23D 14/26; F23D 14/74; F23D 11/02; F23D 11/383; F23D 11/406; F23D 11/38; F23D 11/446; F23D 14/02; F23D 11/42; F23D 11/448; F23N 1/00; F23N 1/02; F23N 5/00; F23N 1/002; F23N 5/265; F23C 6/042; F23C 9/06; F23C 99/001; F23L 7/007
(Continued)

(56) References Cited

U.S. PATENT DOCUMENTS

| 3,076,605 A | 2/1963 | Holden |
| 3,681,002 A * | 8/1972 | Weller ............... F23Q 11/00 431/268 |

(Continued)

FOREIGN PATENT DOCUMENTS

| JP | 06-026624 | 2/1994 |
| JP | 07-083076 | 3/1995 |

(Continued)

OTHER PUBLICATIONS

PCT International Search Report and Written Opinion of PCT/US2014/016632 mailed May 26, 2014.
(Continued)

*Primary Examiner* — Alfred Basichas
(74) *Attorney, Agent, or Firm* — Christopher A. Wiklof; Nicholas S. Bromer; Launchpad IP, Inc.

(57) ABSTRACT

A combustion system outputs fuel gas from a plurality of fuel ejectors toward a forward end of a burner wall and preheats a perforated flame holder by sustaining combustion reaction of the fuel gas at combustion zone between the burner wall and a perforated flame holder. The combustion system then outputs fuel gas from the fuel ejectors onto the perforated flame holder and sustains a combustion reaction of the fuel gas within the perforated flame holder.

20 Claims, 12 Drawing Sheets

Related U.S. Application Data

(60) Provisional application No. 61/765,022, filed on Feb. 14, 2013, provisional application No. 61/931,407, filed on Jan. 24, 2014.

(51) Int. Cl.

| | | |
|---|---|---|
| F23N 5/26 | (2006.01) | |
| F27D 11/06 | (2006.01) | |
| F23D 14/24 | (2006.01) | |
| F23D 14/84 | (2006.01) | |
| F23N 5/00 | (2006.01) | |
| F23N 1/00 | (2006.01) | |
| F23D 14/02 | (2006.01) | |
| F23D 14/74 | (2006.01) | |
| F23D 14/14 | (2006.01) | |
| F23D 11/44 | (2006.01) | |
| F23D 11/02 | (2006.01) | |
| F23D 11/38 | (2006.01) | |
| F23D 11/40 | (2006.01) | |
| F23L 7/00 | (2006.01) | |
| F23C 9/06 | (2006.01) | |
| F23D 14/26 | (2006.01) | |
| F23N 1/02 | (2006.01) | |
| F23D 11/42 | (2006.01) | |

(52) U.S. Cl.
CPC ............ *F23D 11/38* (2013.01); *F23D 11/383* (2013.01); *F23D 11/406* (2013.01); *F23D 11/42* (2013.01); *F23D 11/446* (2013.01); *F23D 11/448* (2013.01); *F23D 14/02* (2013.01); *F23D 14/14* (2013.01); *F23D 14/145* (2013.01); *F23D 14/24* (2013.01); *F23D 14/26* (2013.01); *F23D 14/74* (2013.01); *F23D 14/84* (2013.01); *F23L 7/007* (2013.01); *F23N 1/00* (2013.01); *F23N 1/002* (2013.01); *F23N 1/02* (2013.01); *F23N 5/00* (2013.01); *F23N 5/265* (2013.01); *F27D 11/06* (2013.01); *F23C 2201/00* (2013.01); *F23C 2900/00* (2013.01); *F23D 2203/102* (2013.01); *F23D 2203/104* (2013.01); *F23D 2203/105* (2013.01); *F23D 2203/1023* (2013.01); *F23D 2207/00* (2013.01); *F23N 2021/00* (2013.01); *F23N 2027/22* (2013.01); *F23N 2900/00* (2013.01); *Y02T 50/677* (2013.01)

(58) Field of Classification Search
USPC ..................... 431/12, 116, 18, 328
See application file for complete search history.

(56) References Cited

U.S. PATENT DOCUMENTS

| | | | |
|---|---|---|---|
| 4,021,188 A | 5/1977 | Yamagishi et al. | |
| 4,081,958 A | 4/1978 | Schelp | |
| 4,093,430 A | 6/1978 | Schwab et al. | |
| 4,362,016 A | 12/1982 | Papadopulos | |
| 4,408,461 A | 10/1983 | Bruhwiler et al. | |
| 4,588,373 A * | 5/1986 | Tonon ..................... | F24C 3/14 |
| | | | 126/39 J |
| 4,675,029 A | 6/1987 | Norman et al. | |
| 5,275,552 A | 1/1994 | Schwartz et al. | |
| 5,288,303 A | 2/1994 | Woracek et al. | |
| 5,300,270 A | 4/1994 | Krigmont et al. | |
| 5,326,257 A | 7/1994 | Taylor et al. | |
| 5,441,402 A | 8/1995 | Reuther et al. | |
| 5,458,481 A | 10/1995 | Surbey et al. | |
| 5,470,222 A | 11/1995 | Holowczak et al. | |
| 5,542,840 A | 8/1996 | Surbey et al. | |
| 5,667,374 A | 9/1997 | Nutcher et al. | |
| 5,713,206 A | 2/1998 | McWhirter et al. | |
| 5,718,573 A | 2/1998 | Knight et al. | |
| 5,846,067 A | 12/1998 | Nishiyama et al. | |
| 6,211,490 B1 | 4/2001 | Nosse | |
| 6,379,146 B1 | 4/2002 | Zink et al. | |
| 6,394,792 B1 | 5/2002 | McDonald et al. | |
| 6,499,990 B1 * | 12/2002 | Zink ...................... | F23C 9/006 |
| | | | 431/115 |
| 6,626,661 B1 | 9/2003 | Zink et al. | |
| 7,670,135 B1 | 3/2010 | Zink et al. | |
| 7,837,962 B2 | 11/2010 | Eiteneer et al. | |
| 9,377,190 B2 | 6/2016 | Karkow et al. | |
| 9,388,981 B2 | 7/2016 | Karkow et al. | |
| 9,447,965 B2 | 9/2016 | Karkow et al. | |
| 2002/0155403 A1 | 10/2002 | Griffin et al. | |
| 2004/0058290 A1 | 3/2004 | Mauzey et al. | |
| 2004/0197719 A1 | 10/2004 | Chung et al. | |
| 2007/0071657 A1 | 3/2007 | Okubo et al. | |
| 2011/0027734 A1 | 2/2011 | Hartwick et al. | |
| 2011/0072786 A1 | 3/2011 | Tokuda et al. | |
| 2011/0076628 A1 | 3/2011 | Miura et al. | |
| 2015/0118629 A1 | 4/2015 | Colannino et al. | |
| 2015/0276217 A1 | 10/2015 | Karkow et al. | |
| 2015/0316261 A1 | 11/2015 | Karkow et al. | |
| 2015/0330625 A1 | 11/2015 | Karkow et al. | |
| 2015/0362177 A1 | 12/2015 | Krichtafovitch et al. | |
| 2015/0362178 A1 | 12/2015 | Karkow et al. | |
| 2015/0369477 A1 | 12/2015 | Karkow et al. | |
| 2016/0003471 A1 | 1/2016 | Karkow et al. | |
| 2016/0018103 A1 | 1/2016 | Karkow et al. | |
| 2016/0025333 A1 | 1/2016 | Karkow et al. | |
| 2016/0025374 A1 | 1/2016 | Karkow et al. | |
| 2016/0025380 A1 | 1/2016 | Karkow et al. | |
| 2016/0046524 A1 | 2/2016 | Colannino et al. | |
| 2016/0091200 A1 | 3/2016 | Colannino et al. | |
| 2016/0230984 A1 | 8/2016 | Colannino et al. | |
| 2016/0238240 A1 | 8/2016 | Colannino et al. | |
| 2016/0238242 A1 | 8/2016 | Karkow et al. | |
| 2016/0238277 A1 | 8/2016 | Colannino et al. | |
| 2016/0238318 A1 | 8/2016 | Colannino et al. | |
| 2016/0245509 A1 | 8/2016 | Karkow et al. | |

FOREIGN PATENT DOCUMENTS

| | | |
|---|---|---|
| JP | 2006-275482 | 10/2006 |
| WO | WO 2014/127305 | 8/2014 |
| WO | WO 2014/127306 | 8/2014 |
| WO | WO 2014/127307 | 8/2014 |
| WO | WO 2014/127311 | 8/2014 |
| WO | WO 2015/042615 | 3/2015 |
| WO | WO 2015/054323 | 4/2015 |
| WO | WO 2015/061760 | 4/2015 |
| WO | WO 2015/070188 | 5/2015 |
| WO | WO 2015/112950 | 7/2015 |
| WO | WO 2015/123149 | 8/2015 |
| WO | WO 2015/123381 | 8/2015 |
| WO | WO 2015/123670 | 8/2015 |
| WO | WO 2015/123683 | 8/2015 |
| WO | WO 2015/123694 | 8/2015 |
| WO | WO 2015/123696 | 8/2015 |
| WO | WO 2015/123701 | 8/2015 |
| WO | WO 2016/007564 | 1/2016 |
| WO | WO 2016/105489 | 6/2016 |
| WO | WO 2016/133934 | 8/2016 |
| WO | WO 2016/133936 | 8/2016 |
| WO | WO 2016/134061 | 8/2016 |
| WO | WO 2016/134068 | 8/2016 |
| WO | WO 2016/141362 | 9/2016 |

OTHER PUBLICATIONS

PCT International Search Report and Written Opinion of PCT/US2014/016628 mailed May 27, 2014.
PCT International Search Report and Written Opinion of PCT/US2014/016622 mailed May 27, 2014.
PCT International Search Report and Written Opinion of PCT/US2014/016626 mailed Jun. 3, 2014.

(56) References Cited

OTHER PUBLICATIONS

Fric, Thomas F., "Effects of Fuel-Air Unmixedness on NOx Emissions," Sep.-Oct. 1993. Journal of Propulsion and Power, vol. 9, No. 5, pp. 708-713.

* cited by examiner

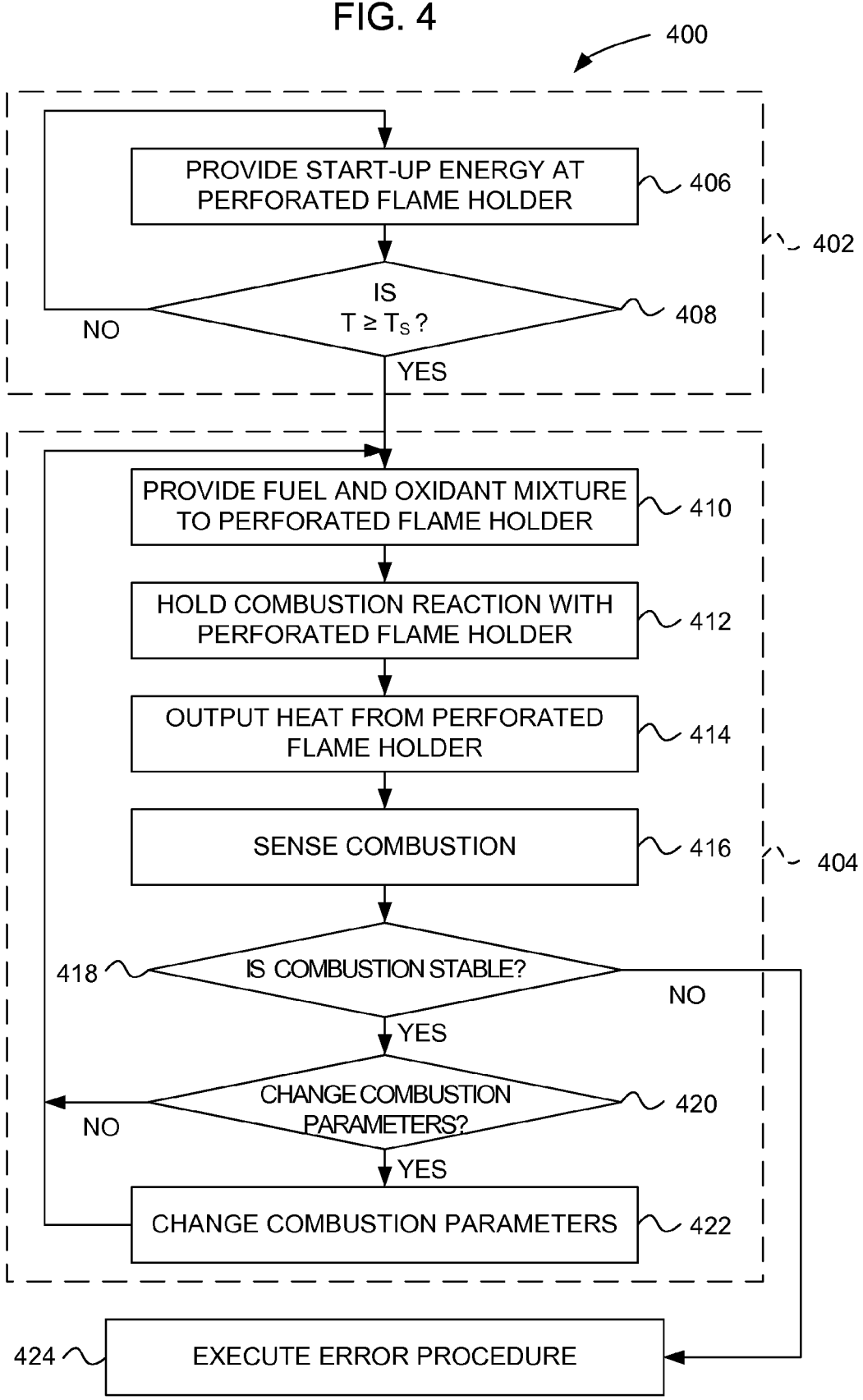

FIG. 7A
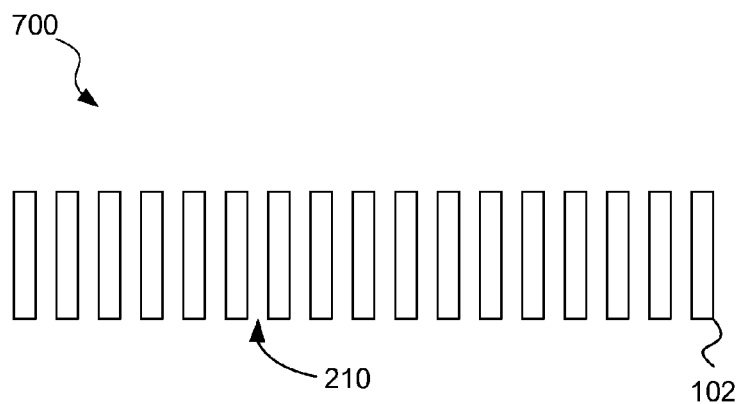
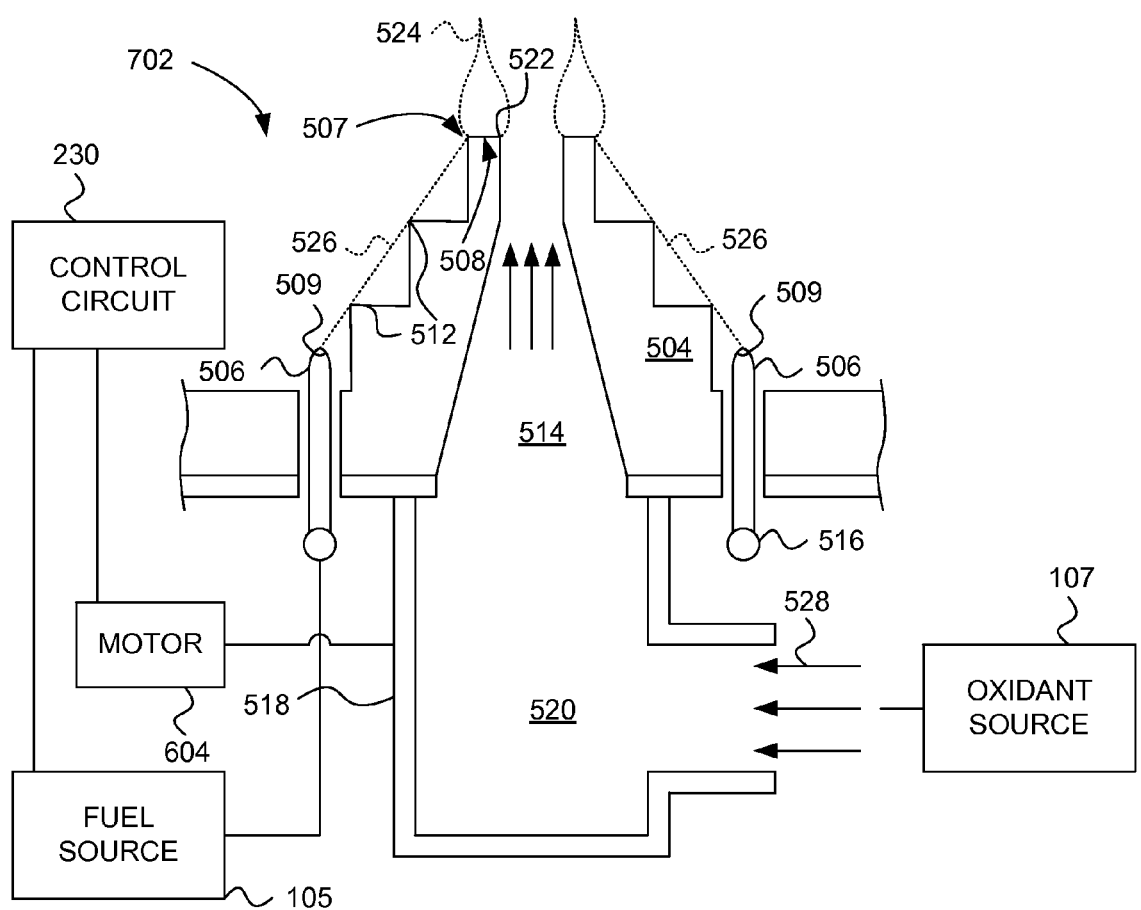

BURNER WITH A SERIES OF FUEL GAS EJECTORS AND A PERFORATED FLAME HOLDER

CROSS REFERENCE TO RELATED APPLICATIONS

The present application is a Continuation in Part of PCT Patent Application No. PCT/US2014/016632, entitled "FUEL COMBUSTION SYSTEM WITH A PERFORATED REACTION HOLDER", filed Feb. 14, 2014, co-pending herewith at the time of filing; which application claims priority benefit of U.S. Provisional Patent Application No. 61/765,022, entitled "PERFORATED FLAME HOLDER AND BURNER INCLUDING A PERFORATED FLAME HOLDER", filed Feb. 14, 2013; and U.S. Provisional Patent Application No. 61/931,407, entitled "LOW NOx FIRE TUBE BOILER", filed Jan. 24, 2014; each of which, to the extent not inconsistent with the disclosure herein, is incorporated by reference.

The present application is related to PCT Patent Application No. PCT/US2014/016628, entitled "PERFORATED FLAME HOLDER AND BURNER INCLUDING A PERFORATED FLAME HOLDER", filed Feb. 14, 2014, co-pending herewith at the time of filing; PCT Patent Application No. PCT/US2014/016622, entitled "STARTUP METHOD AND MECHANISM FOR A BURNER HAVING A PERFORATED FLAME HOLDER", filed Feb. 14, 2014, co-pending herewith at the time of filing; and PCT Patent Application No. PCT/US2014/016626, entitled "SELECTABLE DILUTION LOW NOx BURNER", filed Feb. 14, 2014, co-pending herewith at the time of filing.

SUMMARY

One embodiment is a method for operating a combustion system. The combustion system includes a burner, and a fuel source and an oxidant source coupled to the burner. The fuel source and the oxidant source output fuel and oxidant onto an outside portion of the burner and onto the perforated flame holder. The burner preheats the perforated flame holder by holding a first combustion reaction of the fuel and oxidant. When the perforated flame holder is preheated to a threshold temperature, the perforated flame holder supports a second combustion reaction of the fuel and oxidant within perforations in the perforated flame holder.

BRIEF DESCRIPTION OF THE DRAWINGS

FIG. 4 is a flow chart showing a method for operating a burner system including the perforated flame holder of FIGS. 1, 2 and 3, according to an embodiment.

FIG. 7A is a cross sectional view of a burner system in a preheating mode and including a motor, according to an alternative embodiment.

DETAILED DESCRIPTION

Figure 1:
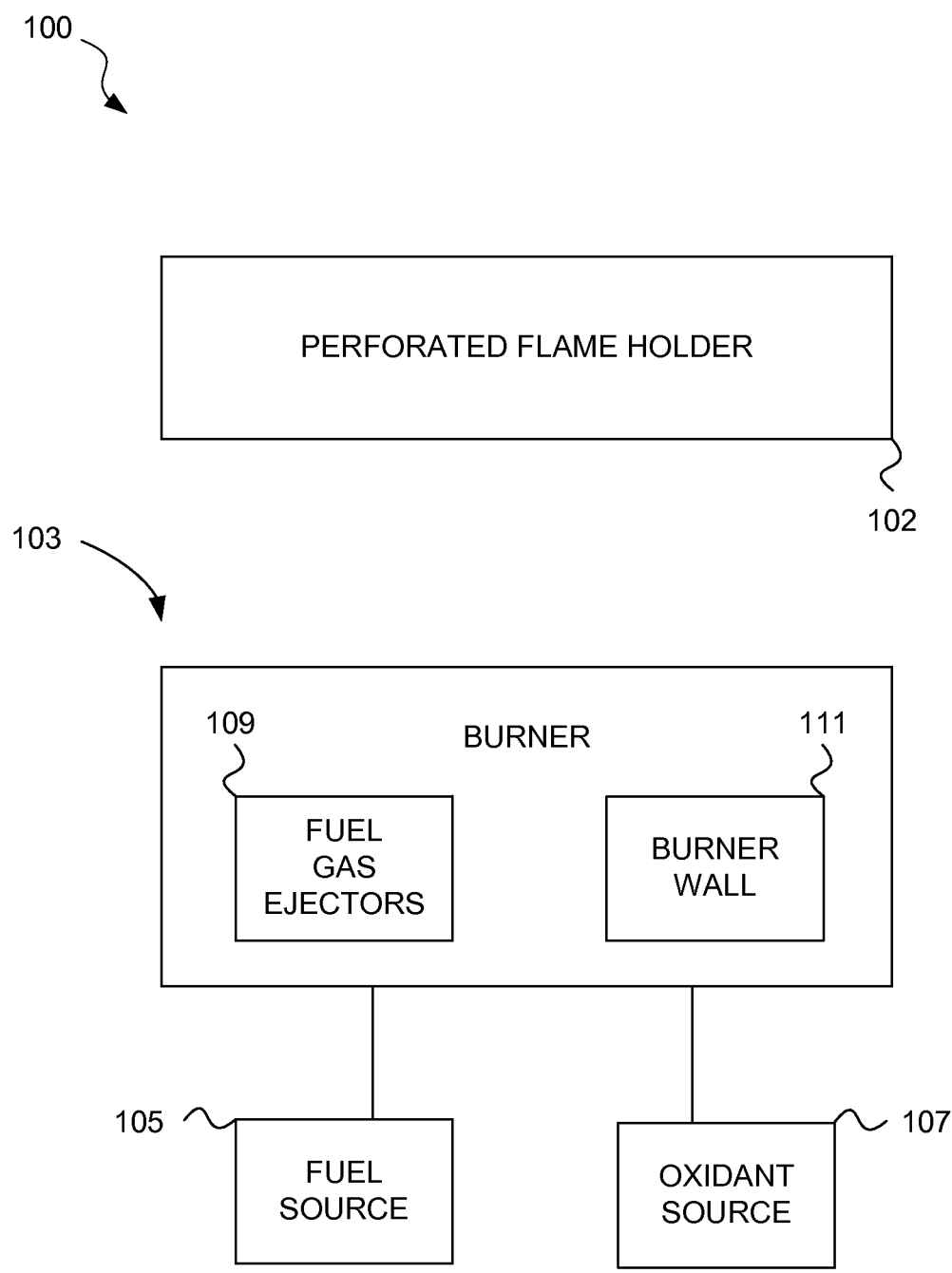
FIG. 1 a block diagram of a combustion system including a burner and a perforated flame holder, according to an embodiment.

In the following detailed description, reference is made to the accompanying drawings, which form a part hereof. In the drawings, similar symbols typically identify similar components, unless context dictates otherwise. Other embodiments may be used and/or other changes may be made without departing from the spirit or scope of the disclosure.

FIG. 1 is a block diagram of a combustion system 100, according to an embodiment. The combustion system 100 includes a perforated flame holder 102, a burner 103, and fuel and oxidant sources 105, 107. The burner 103 further includes fuel gas ejectors 109 and burner wall 111.

According to an embodiment, the fuel and oxidant sources 105, 107 supplies fuel gas and oxidant to the burner 103. The burner 103 outputs the fuel gas and oxidant onto the perforated flame holder 102. Under selected conditions, the fuel gas ejectors 109 output fuel gas onto the perforated flame holder 102. According to an embodiment, the burner 103 can output oxidant via one or more apertures in the burner wall 111.

The perforated flame holder 102 sustains a combustion reaction of the fuel gas and oxidant. For example, if the perforated flame holder 102 is heated to a threshold temperature, and if a mixture of the fuel and oxidant enters the perforated flame holder 102, then the perforated flame holder 102 will sustain a combustion reaction of the fuel and oxidant within the perforated flame holder 102.

According to an embodiment, the burner 103 can be utilized to preheat the perforated flame holder 102 to a threshold temperature at which the perforated flame holder 102 can sustain a combustion reaction of the fuel and oxidant. In particular, the burner 103 can support a startup flame near the perforated flame holder 102 in order to heat the perforated flame holder 102 to the threshold temperature. According to an embodiment, one or more of the fuel gas ejectors 109 output fuel gas onto or near the burner wall 111 while oxidant is output from one or more apertures in the burner wall 111. The burner 103 sustains a startup flame of the fuel gas and oxidant at a position between the burner wall 111 and the perforated flame holder 102, for example on top of the burner wall 111. The startup flame heats the perforated flame holder 102 to a threshold temperature, after which one or more of the fuel gas ejectors 109 outputs fuel gas onto the perforated flame holder 102. The perforated flame holder 102 sustains a combustion reaction of the fuel gas and the oxidant within the perforated flame holder 102.

Figure 2:
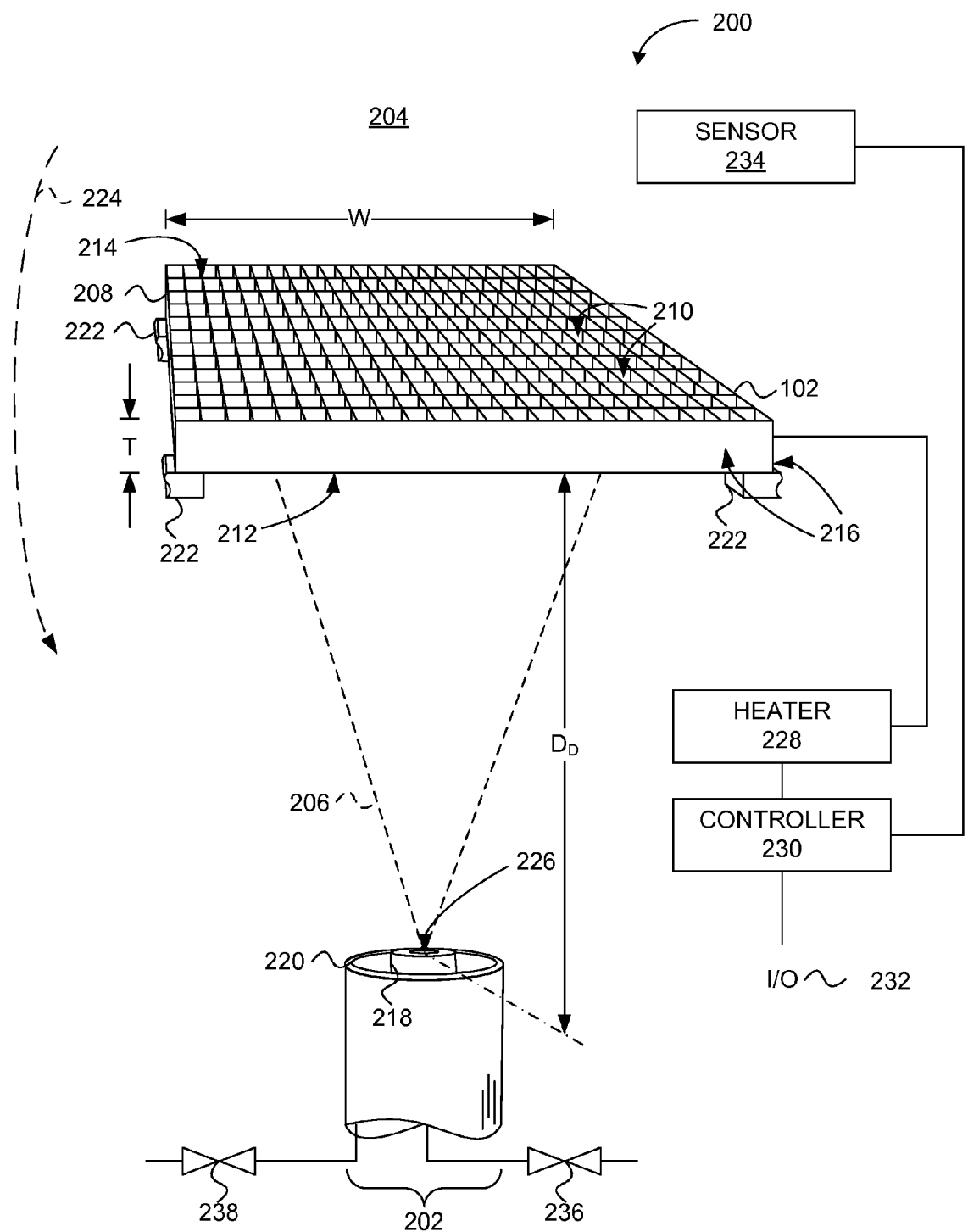
FIG. 2 is a simplified perspective view of a burner system including a perforated flame holder, according to an embodiment.

FIG. 2 is a simplified diagram of a burner system 200 including a perforated flame holder 102 configured to hold a combustion reaction, according to an embodiment. As used herein, the terms perforated flame holder, perforated reaction holder, porous flame holder, and porous reaction holder shall be considered synonymous unless further definition is provided. Experiments performed by the inventors have shown that perforated flame holders 102 described herein can support very clean combustion. Specifically, in experimental use of systems 200 ranging from pilot scale to full scale, output of oxides of nitrogen (NOx) was measured to range from low single digit parts per million (ppm) down to undetectable (less than 1 ppm) concentration of NOx at the stack. These remarkable results were measured at 3% (dry) oxygen ($O_2$) concentration with undetectable carbon monoxide (CO) at stack temperatures typical of industrial furnace applications (1400-1600° F.). Moreover, these results did not require any extraordinary measures such as selective catalytic reduction (SCR), selective non-catalytic reduction (SNCR), water/steam injection, external flue gas recirculation (FGR), or other heroic extremes that may be required for conventional burners to even approach such clean combustion.

According to embodiments, the burner system 200 includes a fuel and oxidant source 202 disposed to output fuel and oxidant into a combustion volume 204 to form a fuel and oxidant mixture 206. As used herein, the terms combustion volume, combustion chamber, furnace volume, and the like shall be considered synonymous unless further definition is provided. The perforated flame holder 102 is disposed in the combustion volume 204 and positioned to receive the fuel and oxidant mixture 206.

Figure 3:
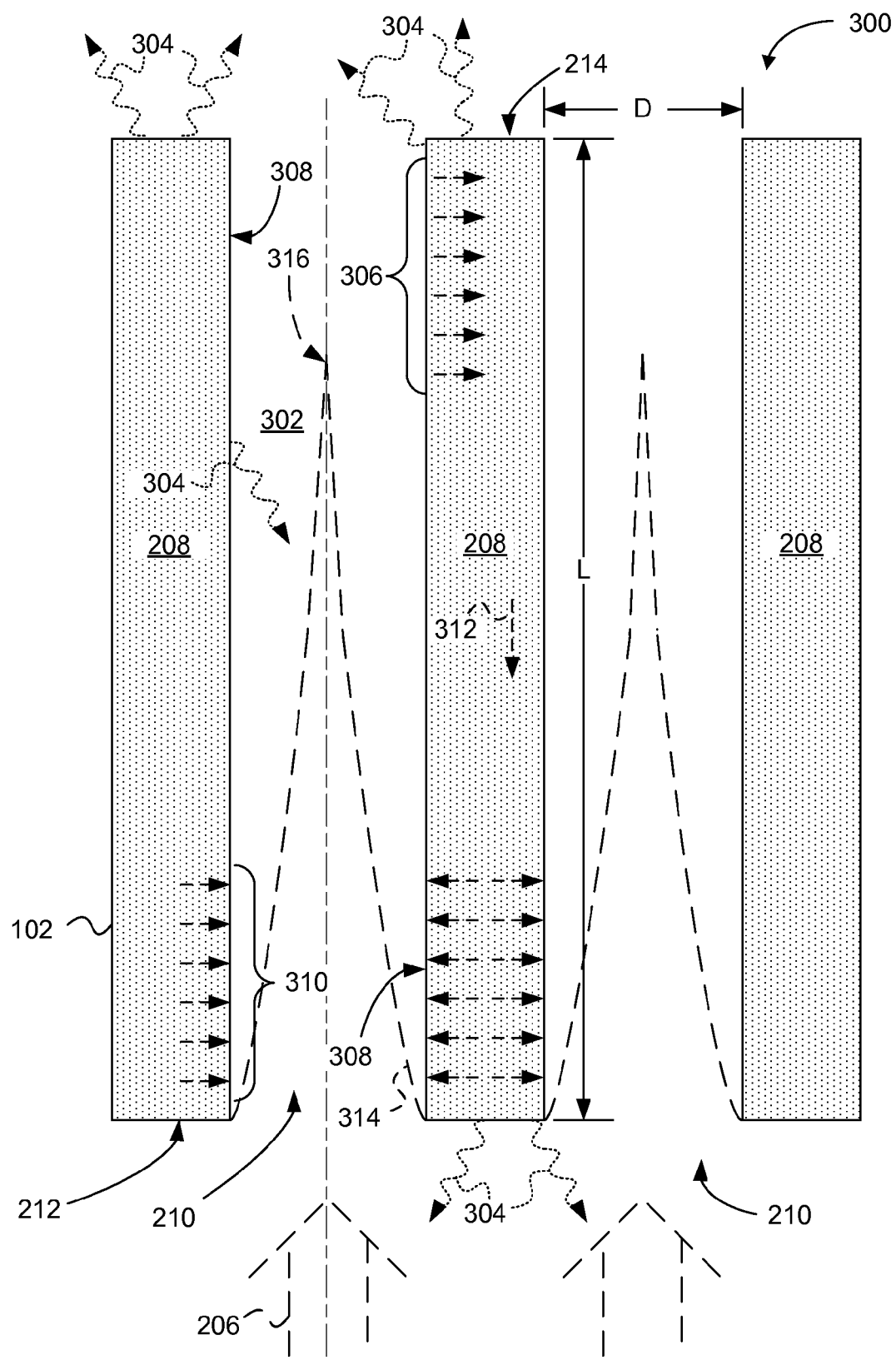
FIG. 3 is side sectional diagram of a portion of the perforated flame holder of FIGS. 1 and 2, according to an embodiment.

FIG. 3 is side sectional diagram 300 of a portion of the perforated flame holder 102 of FIGS. 1 and 2, according to an embodiment. Referring to FIGS. 2 and 3, the perforated flame holder 102 includes a perforated flame holder body 208 defining a plurality of perforations 210 aligned to receive the fuel and oxidant mixture 206 from the fuel and oxidant source 202. As used herein, the terms perforation, pore, aperture, elongated aperture, and the like, in the context of the perforated flame holder 102, shall be considered synonymous unless further definition is provided. The perforations 210 are configured to collectively hold a combustion reaction 302 supported by the fuel and oxidant mixture 206.

The fuel can include hydrogen, a hydrocarbon gas, a vaporized hydrocarbon liquid, an atomized hydrocarbon liquid, or a powdered or pulverized solid. The fuel can be a single species or can include a mixture of gas(es), vapor(s), atomized liquid(s), and/or pulverized solid(s). For example in a process heater application, the fuel can include fuel gas or byproducts from the process that include CO, hydrogen ($H_2$), and methane ($CH_4$). In another application the fuel can include natural gas (mostly $CH_4$) or propane ($C_3H_8$). In another application, the fuel can include #2 fuel oil or #6 fuel oil. Dual fuel applications and flexible fuel applications are similarly contemplated by the inventors. The oxidant can include oxygen carried by air and/or can include another oxidant, either pure or carried by a carrier gas. The terms oxidant and oxidizer shall be considered synonymous herein.

According to an embodiment, the perforated flame holder body 208 can be bounded by an input face 212 disposed to receive the fuel and oxidant mixture 206, an output face 214 facing away from the fuel and oxidant source 202, and a peripheral surface 216 defining a lateral extent of the perforated flame holder 102. The plurality of perforations 210 which are defined by the perforated flame holder body 208 extend from the input face 212 to the output face 214. The plurality of perforations 210 can receive the fuel and oxidant mixture 206 at the input face 212. The fuel and oxidant mixture 206 can then combust in or near the plurality of perforations 210 and combustion products can exit the plurality of perforations 210 at or near the output face 214.

According to an embodiment, the perforated flame holder 102 is configured to hold a majority of the combustion reaction 302 within the perforations 210. For example, on a steady-state basis, more than half the molecules of fuel output into the combustion volume 204 by the fuel and oxidant source 202 may be converted to combustion products between the input face 212 and the output face 214 of the perforated flame holder 102. According to an alternative interpretation, more than half of the heat output by the combustion reaction 302 may be output between the input face 212 and the output face 214 of the perforated flame holder 102. Under nominal operating conditions, the perforations 210 can be configured to collectively hold at least 80% of the combustion reaction 302 between the input face 212 and the output face 214 of the perforated flame holder 102. In some experiments, the inventors produced a combustion reaction that was apparently wholly contained in the perforations 210 between the input face 212 and the output face 214 of the perforated flame holder 102. According to an alternative interpretation, the perforated flame holder 102 can support combustion between the input face 212 and output face 214 when combustion is "time-averaged". For example, during transients, such as before the perforated flame holder 102 is fully heated, or if too high a (cooling) load is placed on the system, the combustion may travel somewhat downstream from the output face 214 of the perforated flame holder 102.

While a "flame" is described in a manner intended for ease of description, it should be understood that in some instances, no visible flame is present. Combustion occurs primarily within the perforations 210, but the "glow" of combustion heat is dominated by a visible glow of the perforated flame holder 102 itself. In other instances, the inventors have noted transient "huffing" wherein a visible flame momentarily ignites in a region lying between the input face 212 of the perforated flame holder 102 and a fuel source 218, within the dilution region $D_D$. Such transient huffing is generally short in duration such that, on a time-averaged basis, a majority of combustion occurs within the perforations 210 of the perforated flame holder 102, between the input face 212 and the output face 214. In still other instances, the inventors have noted apparent combustion occurring above the output face 214 of the perforated flame holder 102, but still a majority of combustion occurred within the perforated flame holder 102 as evidenced by the continued visible glow (a visible wavelength tail of blackbody radiation) from the perforated flame holder 102.

The perforated flame holder 102 can be configured to receive heat from the combustion reaction 302 and output a portion of the received heat as thermal radiation 304 to heat-receiving structures (e.g., furnace walls and/or radiant section working fluid tubes) in or adjacent to the combustion volume 204. As used herein, terms such as thermal radiation, infrared radiation, radiant heat, heat radiation, etc. are to be construed as being substantially synonymous, unless further definition is provided. Specifically, such terms refer to blackbody radiation of electromagnetic energy, primarily in infrared wavelengths.

Referring especially to FIG. 3, the perforated flame holder 102 outputs another portion of the received heat to the fuel and oxidant mixture 206 received at the input face 212 of the perforated flame holder 102. The perforated flame holder body 208 may receive heat from the (exothermic) combustion reaction 302 at least in heat receiving regions 306 of perforation walls 308. Experimental evidence has suggested to the inventors that the position of the heat receiving regions 306, or at least the position corresponding to a maximum rate of receipt of heat, can vary along the length of the perforation walls 308. In some experiments, the location of maximum receipt of heat was apparently between $\frac{1}{3}$ and $\frac{1}{2}$ of the distance from the input face 212 to the output face 214 (i.e., somewhat nearer to the input face 212 than to the output face 214). The inventors contemplate that the heat receiving regions 306 may lie nearer to the output face 214 of the perforated flame holder 102 under other conditions. Most probably, there is no clearly defined edge of the heat receiving regions 306 (or for that matter, the heat output regions 310, described below). For ease of understanding, the heat receiving regions 306 and the heat output regions 310 will be described as particular regions 306, 310.

The perforated flame holder body 208 can be characterized by a heat capacity. The perforated flame holder body 208 may hold heat from the combustion reaction 302 in an amount corresponding to the heat capacity times temperature rise, and transfer the heat from the heat receiving regions 306 to heat output regions 310 of the perforation walls 308. Generally, the heat output regions 310 are nearer to the input face 212 than are the heat receiving regions 306. According to one interpretation, the perforated flame holder body 208 can transfer heat from the heat receiving regions 306 to the heat output regions 310 via thermal radiation, depicted graphically as 304. According to another interpretation, the perforated flame holder body 208 can transfer heat from the heat receiving regions 306 to the heat output regions 310 via heat conduction along heat conduction paths 312. The inventors contemplate that both radiation and conduction heat transfer mechanisms may be operative in transferring heat from the heat receiving regions 306 to the heat output regions 310. In this way, the perforated flame holder 102 may act as a heat source to maintain the combustion reaction 302, even under conditions where a combustion reaction would not be stable when supported from a conventional flame holder.

The inventors believe that the perforated flame holder 102 causes the combustion reaction 302 to occur within thermal boundary layers 314 formed adjacent to walls 308 of the perforations 210. As the relatively cool fuel and oxidant mixture 206 approaches the input face 212, the flow is split into portions that respectively travel through individual perforations 210. The hot perforated flame holder body 208 transfers heat to the fluid, notably within thermal boundary layers 314 that progressively thicken as more and more heat is transferred to the incoming fuel and oxidant mixture 206. After reaching a combustion temperature (e.g. the autoignition temperature of the fuel), the reactants continue to flow while a chemical ignition delay time elapses, over which time the combustion reaction 302 occurs. Accordingly, the combustion reaction 302 is shown as occurring within the thermal boundary layers 314. As flow progresses, the thermal boundary layers 314 merge at a merger point 316. Ideally, the merger point 316 lies between the input face 212 and output face 214 that defines the ends of the perforations 210. At some point, the combustion reaction 302 causes the flowing gas (and plasma) to output more heat to the body 208 than it receives from the body 208. The heat is received at the heat receiving region 306, is held by the body 208, and is transported to the heat output region 310 nearer to the input face 212, where the heat recycles into the cool reactants (and any included diluent) to raise them to the combustion temperature.

In an embodiment, the plurality of perforations 210 are each characterized by a length L defined as a reaction fluid propagation path length between the input face 212 and the output face 214 of the perforated flame holder 102. The reaction fluid includes the fuel and oxidant mixture 206 (optionally including nitrogen, flue gas, and/or other "non-reactive" species), reaction intermediates (including transition states in a plasma that characterizes the combustion reaction 302), and reaction products.

The plurality of perforations 210 can be each characterized by a transverse dimension D between opposing perforation walls 308. The inventors have found that stable combustion can be maintained in the perforated flame holder 102 if the length L of each perforation 210 is at least four times the transverse dimension D of the perforation 210. In other embodiments, the length L can be greater than six times the transverse dimension D. For example, experiments have been run where L is at least eight, at least twelve, at least sixteen, and at least twenty-four times the transverse dimension D. Preferably, the length L is sufficiently long for thermal boundary layers 314 formed adjacent to the perforation walls 308 in a reaction fluid flowing through the perforations 210 to converge at merger points 316 within the perforations 210 between the input face 212 and the output face 214 of the perforated flame holder 102. In experiments, the inventors have found L/D ratios between 12 and 48 to work well (i.e., produce low NOx, produce low CO, and maintain stable combustion).

The perforated flame holder body 208 can be configured to convey heat between adjacent perforations 210. The heat conveyed between adjacent perforations 210 can be selected to cause heat output from the combustion reaction portion 302 in a first perforation 210 to supply heat to stabilize a combustion reaction portion 302 in an adjacent perforation 210.

Referring especially to FIG. 2, the fuel and oxidant source 202 can further include the fuel nozzle 218, configured to output fuel, and an oxidant source 220 configured to output a fluid including the oxidant. For example, the fuel nozzle 218 can be configured to output pure fuel. The oxidant source 220 can be configured to output combustion air carrying oxygen.

The perforated flame holder 102 can be held by a perforated flame holder support structure 222 configured to hold the perforated flame holder 102 a distance $D_D$ away from the fuel nozzle 218. The fuel nozzle 218 can be configured to emit a fuel jet selected to entrain the oxidant to form the fuel and oxidant mixture 206 as the fuel jet and oxidant travel along a path to the perforated flame holder 102 through a dilution distance $D_D$ between the fuel nozzle 218 and the perforated flame holder 102. Additionally or alternatively (particularly when a blower is used to deliver oxidant combustion air), the oxidant or combustion air source 220 can be configured to entrain the fuel and the fuel and oxidant travel through the dilution distance $D_D$. In some embodiments, a flue gas recirculation path 224 can be provided. Additionally or alternatively, the fuel nozzle 218 can be configured to emit a fuel jet selected to entrain the oxidant and to entrain flue gas as the fuel jet travels through a dilution distance $D_D$ between the fuel nozzle 218 and the input face 212 of the perforated flame holder 102.

The fuel nozzle 218 can be configured to emit the fuel through one or more fuel orifices 226 having a dimension that is referred to as "nozzle diameter". The perforated flame holder support structure 222 can support the perforated flame holder 102 to receive the fuel and oxidant mixture 206 at a distance $D_D$ away from the fuel nozzle 218 greater than 20 times the nozzle diameter. In another embodiment, the perforated flame holder 102 is disposed to receive the fuel and oxidant mixture 206 at a distance $D_D$ away from the fuel nozzle 218 between 100 times and 1100 times the nozzle diameter. Preferably, the perforated flame holder support structure 222 is configured to hold the perforated flame holder 102 about 200 times the nozzle diameter or more away from the fuel nozzle 218. When the fuel and oxidant mixture 206 travels about 200 times the nozzle diameter or more, the mixture is sufficiently homogenized to cause the combustion reaction 302 (shown in FIG. 3) to output minimal NOx.

The fuel and oxidant source 202 can alternatively include a premix fuel and oxidant source, according to an embodiment. A premix fuel and oxidant source can include a premix chamber (not shown), a fuel nozzle configured to output fuel into the premix chamber, and an air channel configured to output combustion air into the premix chamber. A flame arrestor can be disposed between the premix fuel and oxidant source and the perforated flame holder 102 and be configured to prevent flame flashback into the premix fuel and oxidant source.

The oxidant source 220, whether configured for entrainment in the combustion volume 204 or for premixing can include a blower configured to force air through the fuel and air source 202.

The support structure 222 can be configured to support the perforated flame holder 102 from a floor or wall (not shown) of the combustion volume 204, for example. In another embodiment, the support structure 222 supports the perforated flame holder 102 from the fuel and oxidant source 202. Alternatively, the support structure 222 can suspend the perforated flame holder 102 from an overhead structure (such as a flue, in the case of an up-fired system). The support structure 222 can support the perforated flame holder 102 in various orientations and directions.

The perforated flame holder 102 can include a single perforated flame holder body 208. In another embodiment, the perforated flame holder 102 can include a plurality of adjacent perforated flame holder sections that collectively provide a tiled perforated flame holder 102.

The perforated flame holder support structure 222 can be configured to support the plurality of perforated flame holder sections. The perforated flame holder support structure 222 can include a metal superalloy, a cementatious, and/or ceramic refractory material. In an embodiment, the plurality of adjacent perforated flame holder sections can be joined with a fiber reinforced refractory cement.

The perforated flame holder 102 can have a width dimension W between opposite sides of the peripheral surface 216 at least twice a thickness dimension T between the input face 212 and the output face 214. In another embodiment, the perforated flame holder 102 can have a width dimension W between opposite sides of the peripheral surface 216 at least three times, at least six times, or at least nine times a thickness dimension T between the input face 212 and the output face 214 of the perforated flame holder 102.

In an embodiment, the perforated flame holder 102 can have a width dimension W less than a width of the combustion volume 204. This can allow the flue gas circulation path 224 from above to below the perforated flame holder 102 to lie between the peripheral surface 216 of the perforated flame holder 102 and the combustion volume wall (not shown).

Referring again to both FIGS. 2 and 3, the perforations 210 can include elongated squares, each of the elongated squares has a transverse dimension D between opposing sides of the squares. In another embodiment, the perforations 210 can include elongated hexagons, each of the elongated hexagons has a transverse dimension D between opposing sides of the hexagons. In another embodiment, the perforations 210 can include hollow cylinders, each of the hollow cylinders has a transverse dimension D corresponding to a diameter of the cylinders. In another embodiment, the perforations 210 can include truncated cones, each of the truncated cones has a transverse dimension D that is rotationally symmetrical about a length axis that extends from the input face 212 to the output face 214. The perforations 210 can each have a lateral dimension D equal to or greater than a quenching distance of the fuel based on standard reference conditions.

In one range of embodiments, each of the plurality of perforations 210 has a lateral dimension D between 0.05 inch and 1.0 inch. Preferably, each of the plurality of perforations 210 has a lateral dimension D between 0.1 inch and 0.5 inch. For example the plurality of perforations 210 can each have a lateral dimension D of about 0.2 to 0.4 inch.

The void fraction of a perforated flame holder 102 is defined as the total volume of all perforations 210 in a section of the perforated flame holder 102 divided by a total volume of the perforated flame holder 102 including body 208 and perforations 210. The perforated flame holder 102 should have a void fraction between 0.10 and 0.90. In an embodiment, the perforated flame holder 102 can have a void fraction between 0.30 and 0.80. In another embodiment, the perforated flame holder 102 can have a void fraction of about 0.70. Using a void fraction of about 0.70 was found to be especially effective for producing very low NOx.

The perforated flame holder 102 can be formed from a fiber reinforced cast refractory material and/or a refractory material such as an aluminum silicate material. For example, the perforated flame holder 102 can be formed from mullite or cordierite. Additionally or alternatively, the perforated flame holder body 208 can include a metal superalloy such as Inconel or Hastelloy. The perforated flame holder body 208 can define a honeycomb.

The inventors have found that the perforated flame holder 102 can be formed from VERSAGRID® ceramic honeycomb, available from Applied Ceramics, Inc. of Doraville, S.C.

The perforations 210 can be parallel to one another and normal to the input and output faces 212, 214. In another embodiment, the perforations 210 can be parallel to one another and formed at an angle relative to the input and output faces 212, 214. In another embodiment, the perforations 210 can be non-parallel to one another. In another embodiment, the perforations 210 can be non-parallel to one another and non-intersecting. In another embodiment, the perforations 210 can be intersecting. The body 208 can be one piece or can be formed from a plurality of sections.

In another embodiment, which is not necessarily preferred, the perforated flame holder 102 may be formed from reticulated fibers formed from an extruded ceramic material. The term "reticulated fibers" refers to a netlike structure.

In another embodiment, the perforated flame holder 102 can include a plurality of tubes or pipes bundled together. The plurality of perforations 210 can include hollow cylinders and can optionally also include interstitial spaces between the bundled tubes. In an embodiment, the plurality of tubes can include ceramic tubes. Refractory cement can be included between the tubes and configured to adhere the tubes together. In another embodiment, the plurality of tubes can include metal (e.g., superalloy) tubes. The plurality of tubes can be held together by a metal tension member circumferential to the plurality of tubes and arranged to hold the plurality of tubes together. The metal tension member can include stainless steel, a superalloy metal wire, and/or a superalloy metal band.

The perforated flame holder body 208 can alternatively include stacked perforated sheets of material, each sheet having openings that connect with openings of subjacent and superjacent sheets. The perforated sheets can include perforated metal sheets, ceramic sheets and/or expanded sheets. In another embodiment, the perforated flame holder body 208 can include discontinuous packing bodies such that the perforations 210 are formed in the interstitial spaces between the discontinuous packing bodies. In one example, the discontinuous packing bodies include structured packing shapes. In another example, the discontinuous packing bodies include random packing shapes. For example, the discontinuous packing bodies can include ceramic Raschig ring, ceramic Berl saddles, ceramic Intalox saddles, and/or metal rings or other shapes (e.g. Super Raschig Rings) that may be held together by a metal cage.

The inventors contemplate various explanations for why burner systems including the perforated flame holder 102 provide such clean combustion.

In one aspect, the perforated flame holder 102 acts as a heat source to maintain a combustion reaction even under conditions where a combustion reaction would not be stable when supported by a conventional flame holder. This capability can be leveraged to support combustion using a leaner fuel-to-oxidant mixture than is typically feasible. Thus, according to an embodiment, at the point where the fuel stream 206 contacts the input face 212 of the perforated flame holder 102, an average fuel-to-oxidant ratio of the fuel stream 206 is below a (conventional) lower combustion limit of the fuel component of the fuel stream—lower combustion limit defines the lowest concentration of fuel at which a fuel/air mixture will burn when exposed to a momentary ignition source under normal atmospheric pressure and an ambient temperature of 25° C. (77° F.).

According to one interpretation, the fuel and oxidant mixtures supported by the perforated flame holder may be more fuel-lean than mixtures that would provide stable combustion in a conventional burner. Combustion near a lower combustion limit of fuel generally burn at a lower adiabatic flame temperature than mixtures near the center of the lean-to-rich combustion limit range. Lower flame temperatures generally evolve a lower concentration of NOx than higher flame temperatures. In conventional flames, too-lean combustion is generally associated with high CO concentration at the stack. In contrast, the perforated flame holder 102 and systems including the perforated flame holder 102 described herein were found to provide substantially complete combustion of CO (single digit ppm down to undetectable, depending on experimental conditions), while supporting low NOx. In some embodiments, the inventors achieved stable combustion at what was understood to be very lean mixtures (that nevertheless produced only about 3% or lower measured $O_2$ concentration at the stack). Moreover, the inventors believe perforation walls 308 may act as a heat sink for the combustion fluid. This effect may alternatively or additionally reduce combustion temperature.

According to another interpretation, production of NOx can be reduced if the combustion reaction 302 occurs over a very short duration of time. Rapid combustion causes the reactants (including oxygen and entrained nitrogen) to be exposed to NOx-formation temperature for a time too short for NOx formation kinetics to cause significant production of NOx. The time required for the reactants to pass through the perforated flame holder 102 is very short compared to a conventional flame. The low NOx production associated with perforated flame holder combustion may thus be related to the short duration of time required for the reactants (and entrained nitrogen) to pass through the perforated flame holder 102.

Since CO oxidation is a relatively slow reaction, the time for passage through the perforated flame holder 102 (perhaps plus time passing toward the flue from the perforated flame holder 102) is apparently sufficient and at sufficiently elevated temperature, in view of the very low measured (experimental and full scale) CO concentrations, for oxidation of CO to carbon dioxide ($CO_2$).

FIG. 4 is a flow chart showing a method 400 for operating a burner system including the perforated flame holder shown and described herein. To operate a burner system including a perforated flame holder, the perforated flame holder is first heated to a temperature sufficient to maintain combustion of the fuel and oxidant mixture.

According to a simplified description, the method 400 begins with step 402, wherein the perforated flame holder is preheated to a start-up temperature, $T_S$. After the perforated flame holder is raised to the start-up temperature, the method proceeds to step 404, wherein fuel and oxidant are provided to the perforated flame holder and combustion is held by the perforated flame holder.

According to a more detailed description, step 402 begins with step 406, wherein start-up energy is provided at the perforated flame holder. Simultaneously or following providing start-up energy, a decision step 408 determines whether the temperature T of the perforated flame holder is at or above the start-up temperature, $T_S$. As long as the temperature of the perforated flame holder is below its start-up temperature, the method loops between steps 406 and 408 within the preheat step 402. In step 408, if the temperature T of at least a predetermined portion of the perforated flame holder is greater than or equal to the start-up temperature, the method 400 proceeds to overall step 404, wherein fuel and oxidant is supplied to and combustion is held by the perforated flame holder.

Step 404 may be broken down into several discrete steps, at least some of which may occur simultaneously.

Proceeding from step 408, a fuel and oxidant mixture is provided to the perforated flame holder, as shown in step 410. The fuel and oxidant may be provided by a fuel and oxidant source that includes a separate fuel nozzle and combustion air source, for example. In this approach, the fuel and combustion air are output in one or more directions selected to cause the fuel and combustion air mixture to be received by an input face of the perforated flame holder. The fuel may entrain the combustion air (or alternatively, the combustion air may dilute the fuel) to provide a fuel and oxidant mixture at the input face of the perforated flame holder at a fuel dilution selected for a stable combustion reaction that can be held within the perforations of the perforated flame holder.

Proceeding to step 412, the combustion reaction is held by the perforated flame holder.

In step 414, heat may be output from the perforated flame holder. The heat output from the perforated flame holder may be used to power an industrial process, heat a working fluid, generate electricity, or provide motive power, for example.

In optional step 416, the presence of combustion may be sensed. Various sensing approaches have been used and are contemplated by the inventors. Generally, combustion held by the perforated flame holder is very stable and no unusual sensing requirement is placed on the system. Combustion sensing may be performed using an infrared sensor, a video sensor, an ultraviolet sensor, a charged species sensor, thermocouple, thermopile, and/or other known combustion sensing apparatuses. In an additional or alternative variant of step 416, a pilot flame or other ignition source may be provided to cause ignition of the fuel and oxidant mixture in the event combustion is lost at the perforated flame holder.

Proceeding to decision step 418, if combustion is sensed not to be stable, the method 400 may exit to step 424, wherein an error procedure is executed. For example, the error procedure may include turning off fuel flow, re-executing the preheating step 402, outputting an alarm signal, igniting a stand-by combustion system, or other steps. If, in step 418, combustion in the perforated flame holder is determined to be stable, the method 400 proceeds to decision step 420, wherein it is determined if combustion parameters should be changed. If no combustion parameters are to be changed, the method loops (within step 404) back to step 410, and the combustion process continues. If a change in combustion parameters is indicated, the method 400 proceeds to step 422, wherein the combustion parameter change is executed. After changing the combustion parameter(s), the method loops (within step 404) back to step 410, and combustion continues.

Combustion parameters may be scheduled to be changed, for example, if a change in heat demand is encountered. For example, if less heat is required (e.g., due to decreased electricity demand, decreased motive power requirement, or lower industrial process throughput), the fuel and oxidant flow rate may be decreased in step 422. Conversely, if heat demand is increased, then fuel and oxidant flow may be increased. Additionally or alternatively, if the combustion system is in a start-up mode, then fuel and oxidant flow may be gradually increased to the perforated flame holder over one or more iterations of the loop within step 404.

Referring again to FIG. 2, the burner system 200 includes a heater 228 operatively coupled to the perforated flame holder 102. As described in conjunction with FIGS. 3 and 4, the perforated flame holder 102 operates by outputting heat to the incoming fuel and oxidant mixture 206. After combustion is established, this heat is provided by the combustion reaction; but before combustion is established, the heat is provided by the heater 228.

Various heating apparatuses have been used and are contemplated by the inventors. In some embodiments, the heater 228 can include a flame holder configured to support a flame disposed to heat the perforated flame holder 102. The fuel and oxidant source 202 can include the fuel nozzle 218 configured to emit a fuel stream and the air source 220 configured to output combustion air adjacent to the fuel stream. The fuel nozzle 218 and air source 220 can be configured to output the fuel stream to be progressively diluted by the combustion air. The perforated flame holder 102 can be disposed to receive a diluted fuel and air mixture 206 that supports a combustion reaction that is stabilized by the perforated flame holder 102 when the perforated flame holder 102 is at an operating temperature. A start-up flame holder, in contrast, can be configured to support a start-up flame at a location corresponding to a relatively rich fuel and air mixture that is stable without stabilization provided by the heated perforated flame holder 102.

The burner system 200 can further include a controller 230 operatively coupled to the heater 228 and to a data interface 232. For example, the controller 230 can be configured to control a start-up flame holder actuator configured to cause the start-up flame holder to hold the start-up flame when the perforated flame holder 102 needs to be pre-heated and to not hold the start-up flame when the perforated flame holder 102 is at an operating temperature (e.g., when $T \geq T_S$).

Various approaches for actuating a start-up flames are contemplated. In one embodiment, the start-up flame holder includes a mechanically-actuated bluff body configured to be actuated to intercept the fuel and oxidant mixture 206 to cause heat-recycling vortices and thereby hold a start-up flame; or to be actuated to not intercept the fuel and oxidant mixture 206 to cause the fuel and oxidant mixture 206 to proceed to the perforated flame holder 102. In another embodiment, a fuel control valve, blower, and/or damper may be used to select a fuel and oxidant mixture flow rate that is sufficiently low for a start-up flame to be jet-stabilized; and upon reaching an perforated flame holder 102 operating temperature, the flow rate may be increased to "blow out" the start-up flame. In another embodiment, the heater may include an electrical power supply operatively coupled to the controller 230 and configured to apply an electrical charge or voltage to the fuel and oxidant mixture 206. An electrically conductive start-up flame holder may be selectively coupled to a voltage ground or other voltage selected to attract the electrical charge in the fuel and oxidant mixture 206. The attraction of the electrical charge was found by the inventors to cause a start-up flame to be held by the electrically conductive start-up flame holder.

In another embodiment, the heater 228 may include an electrical resistance heater configured to output heat to the perforated flame holder and/or to the fuel and oxidant mixture 206. The electrical resistance heater 228 can be configured to heat up the perforated flame holder 102 to an operating temperature. The heater 228 can further include a power supply and a switch operable, under control of the controller 230, to selectively couple the power supply to the electrical resistance heater 228.

An electrical resistance heater 228 can be formed in various ways. For example, the electrical resistance heater 228 can be formed from KANTHAL® wire (available from Sandvik Materials Technology division of Sandvik AB of Hallstahammar, Sweden) threaded through at least a portion of the perforations 210 defined formed by the perforated flame holder body 208. Alternatively, the heater 228 can include an inductive heater, a high energy (e.g. microwave or laser) beam heater, a frictional heater, or other types of heating technologies.

Other forms of start-up apparatuses are contemplated. For example, the heater 228 can include an electrical discharge igniter or hot surface igniter configured to output a pulsed ignition to the air and fuel. Additionally or alternatively, a start-up apparatus can include a pilot flame apparatus disposed to ignite a fuel and oxidant mixture 206 that would otherwise enter the perforated flame holder 102. An electrical discharge igniter, hot surface igniter, and/or pilot flame apparatus can be operatively coupled to the controller 230, which can cause the electrical discharge igniter or pilot flame apparatus to maintain combustion of the fuel and oxidant mixture 206 in or upstream from the perforated flame holder 102 before the perforated flame holder 102 is heated sufficiently to maintain combustion.

The burner system 200 can further include a sensor 234 operatively coupled to the control circuit 230. The sensor 234 can include a heat sensor configured to detect infrared radiation or a temperature of the perforated flame holder 102. The control circuit 230 can be configured to control the heater 228 responsive to input from the sensor 234. Optionally, a fuel control valve 236 can be operatively coupled to the controller 230 and configured to control a flow of fuel to the fuel and oxidant source 202. Additionally or alternatively, an oxidant blower or damper 238 can be operatively coupled to the controller 230 and configured to control flow of the oxidant (or combustion air).

The sensor 234 can further include a combustion sensor operatively coupled to the control circuit 230, the combustion sensor being configured to detect a temperature, video image, and/or spectral characteristic of a combustion reaction held by the perforated flame holder 102. The fuel control valve 236 can be configured to control a flow of fuel from a fuel source to the fuel and oxidant source 202. The controller 230 can be configured to control the fuel control valve 236 responsive to input from the combustion sensor 234. The controller 230 can be configured to control the fuel control valve 236 and/or oxidant blower or damper 238 to control a preheat flame type of heater 228 to heat the perforated flame holder 102 to an operating temperature. The controller 230 can similarly control the fuel control valve 236 and/or the oxidant blower or damper to change the fuel and oxidant mixture 206 flow responsive to a heat demand change received as data via the data interface 232.

Figure 5A:
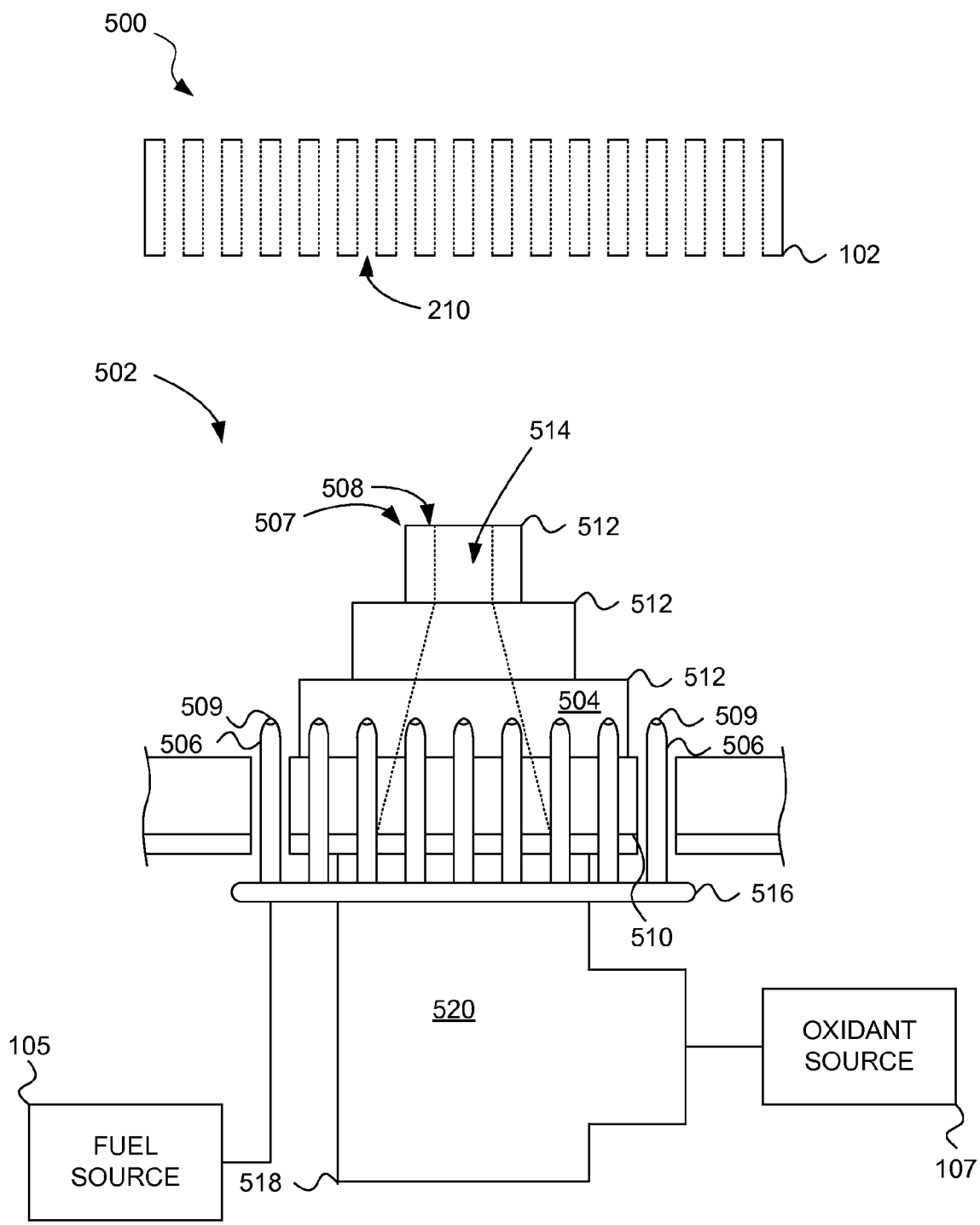
FIG. 5A is a side view of a combustion system including a burner and a perforated flame holder, according to an embodiment.

FIG. 5A is a side view of a combustion system 500, according to an embodiment. The combustion system 500 includes a burner 502, a perforated flame holder 102, a fuel source 105, and an oxidant source 107.

The burner 502 includes a burner wall 504 and a plurality of fuel gas ejectors 506 positioned outside the burner wall 504. The burner wall 504 includes a forward end 508 and a base end 510. The burner wall 504 further includes a series of concentric impact ledges 512 and an interior passage way 514 within the burner wall 504.

The plurality of fuel gas ejectors 506 surround the burner wall 504. The fuel gas ejectors 506 are positioned longitudinally rearward and laterally outward from the forward end 508 of the burner wall 504. The fuel gas ejectors 506 are coupled to a fuel supply manifold 516, which is in turn coupled to the fuel source 105.

The burner 502 includes a housing 518 coupled to the base end 510 of the burner wall 504. An interior 520 of the housing 518 is communicably coupled to the interior passageway 514 and the oxidant source 107.

According to an embodiment, the burner system 500 operates to sustain a combustion reaction of fuel gas and oxidant within the perforations 210 of the perforated flame holder 102. In particular, the fuel source 105 supplies fuel gas to the fuel gas ejectors 506 via the fuel supply manifold 516. One or more of the fuel gas ejectors 506 eject fuel gas onto the perforated flame holder 102. At the same time, the oxidant source 107 supplies an oxidant, for example combustion air, to the interior passage 514 via the interior 520 of the housing 518. Oxidant is ejected from the interior passageway 514 towards the perforated flame holder 102. The perforated flame holder 102 supports a combustion reaction of the fuel gas and the oxidant within the perforations 210 of the perforated flame holder 102.

According to an embodiment, the burner system 500 can preheat the perforated flame holder 102 to a threshold temperature prior to supporting the combustion reaction within the perforated flame holder 102. In the preheat mode, the burner system 500 supports a preheat flame at a position between the perforated flame holder 102 and the burner wall 504. In particular, one or more of the fuel gas ejectors 506 eject fuel gas toward the forward end 508 of the burner wall 504. At the same time, oxidant is ejected from the interior passageway 514. The fuel gas and the oxidant combust at the forward end 508 of the burner wall 504, thereby supporting a preheat flame on top of the forward end 508 of the burner wall 504.

Depending primarily upon the size of the burner 502 and the capacity requirements of the particular application in question, generally any number and spacing of the fuel gas ejectors 506 can be used. The spacing between adjacent pairs of fuel gas ejectors 506 will typically be the same, but can be different. According to an embodiment, in order to provide selected performance and fuel gas conditioning (i.e., flue gas entrainment and mixing), the burner 502 has at least 10 fuel gas ejectors 506 positioned relatively close to each other such that the ejectors 506 provide an array of adjacent fuel gas jet flow streams traveling together toward a combustion zone 507 at the forward end 508 of the burner wall 504 in the preheat mode. Each ejector 506 has one or more delivery ports 509 from which fuel gas streams can be ejected. Adjacent pairs of fuel gas ejectors 506 can be spaced a sufficient distance apart, however, such that neighboring ejectors do not interfere with the free jet entrainment of the fuel gas streams as they leave delivery ports 509 of the fuel gas ejectors 506. According to an embodiment, each adjacent pair of fuel gas ejectors 506 is spaced from about 1 to about 4 inches apart, for example 2 inches apart.

Figure 5B:
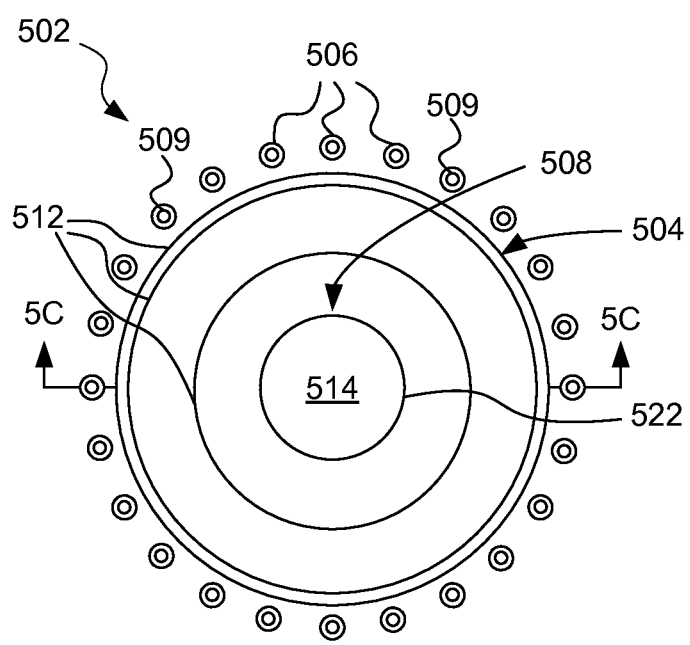
FIG. 5B is a top view of the burner of FIG. 5A, according to an embodiment.

FIG. 5B is a top view of the burner 502 of FIG. 5A, according to an embodiment. The top view illustrates the series of concentric ledges 512 of the burner wall 504 between the plurality of fuel gas ejectors 506 and the forward end 508 of the burner wall 504. An opening 522 in the burner wall 504 at the forward end exposes the interior passageway 514 from which oxidant is expelled into the combustion volume.

Although depicted as circular in FIG. 5B, the burner 502 can be square, rectangular, or generally any other desired shape. In addition, the series of fuel gas ejectors 506 employed in the burner 502 may not entirely surround the base of the burner wall 504 in some embodiments. For example, the fuel gas ejectors 506 may not completely surround the burner wall 504 in certain applications where the burner 502 is used in a furnace sidewall location or must be specially configured to provide a particular desired flame shape.

Figure 5C:
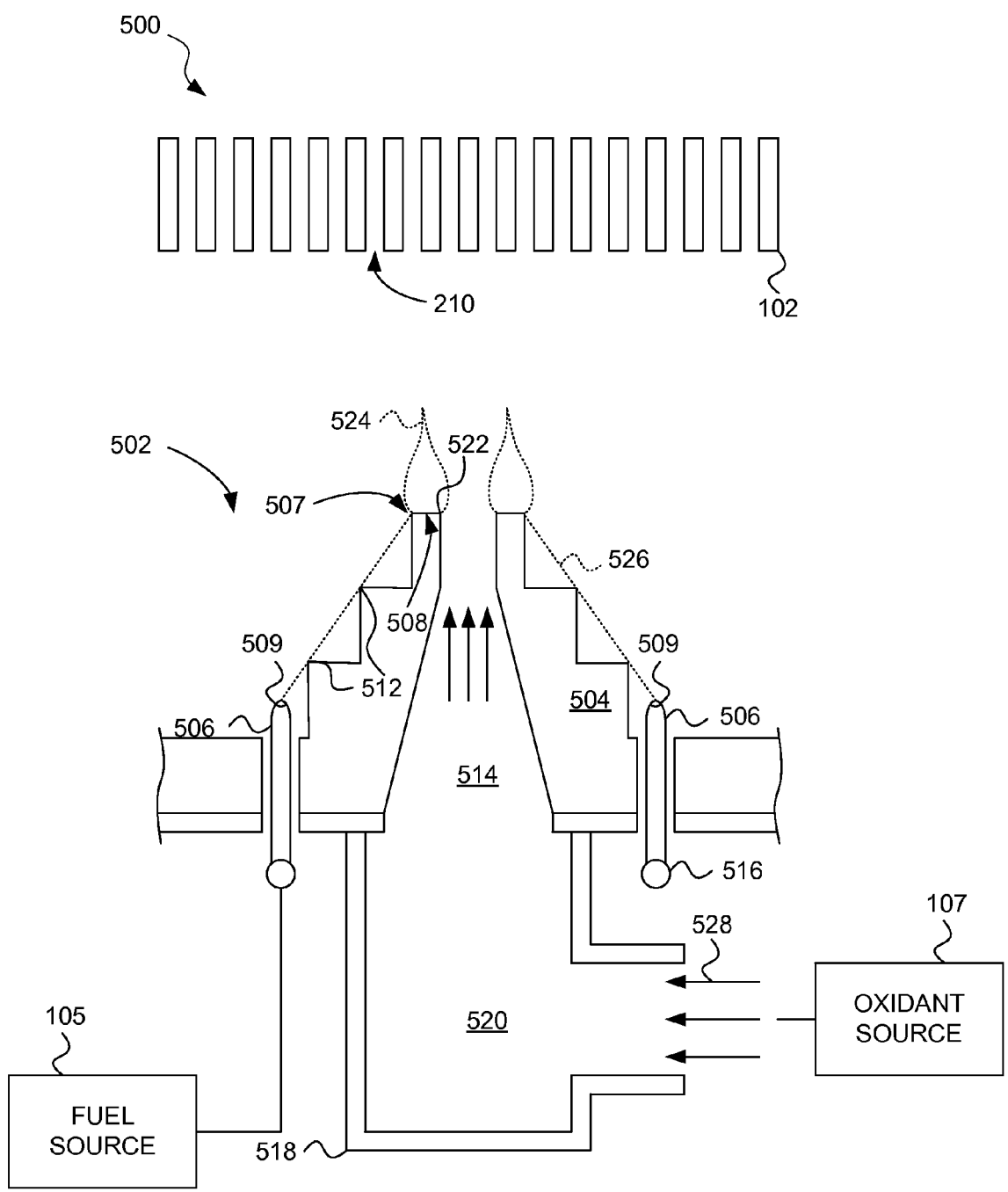
FIG. 5C is a cross sectional view of the burner system of FIG. 5A in a preheating mode, according to an embodiment.

FIG. 5C is a cross-section of the burner system 500 of FIG. 5A operating in a preheat mode, according to an embodiment. In the preheat mode, the burner system 500 preheats the perforated flame holder 102 to a threshold temperature by sustaining a preheat flame 524 at the combustion zone 507 at the forward end 508 of the burner wall 504. The preheat flame 524 heats the perforated flame holder 102 by radiating heat and by passing heated gasses from the preheat flame 524 to the perforated flame holder 102.

In the preheat operation, one or more of the fuel gas ejectors 506 outputs fuel gas stream 526 in a particular trajectory toward the forward end 508 of the burner wall 504 in which at least a portion of the fuel gas impacts one or more of the ledges 512. According to an embodiment, as the fuel gas 526 travels towards the combustion zone 507, the fuel gas 526 entrains flue gas and mixes therewith.

The oxidant source 107 supplies oxidant 528, for example combustion air, to the interior passageway 514 via the interior 520 of the housing 518. The oxidant 528 is expelled from the interior passageway 514 via the opening 522. In this manner oxidant 528 is provided to the combustion zone 507.

The fuel gas 526 and the oxidant 528 combust at the combustion zone 507, thereby supporting the preheat flame 524. The preheat flame 524 is positioned to heat the perforated flame holder 102. According to an embodiment, when the perforated flame holder 102 has reached the threshold temperature, the combustion system 500 enters standard operating mode as described in more detail with respect to FIG. 5D.

According to an embodiment, to further facilitate the entrainment and mixing of flue gas in the fuel gas streams 526, the burner wall 504 includes one or more ledges 512 or other impact structures positioned at least partially within the paths of the fuel gas streams 526. Each ledge 512 can generally be any type of obstruction, which will decrease the flow momentum and/or increase the turbulence of the fuel gas streams 526 sufficiently to promote flue gas entrainment and mixing while allowing the resulting mixture to flow on to combustion zone 507.

Each of the fuel gas ejectors 506 can include one or more delivery ports 509. The individual delivery ports 509 provided in fuel gas ejectors 506 can be of any shape capable of providing a free jet flow and degree of entrainment and mixing desired. Examples of suitable shapes include but are not limited to circles, ellipses, squares, rectangles, and supersonic-type ejection orifices. Additionally, the individual delivery ports 509 of all of the fuel gas ejectors 506 can be of the same shape or can be of any desired combination of differing acceptable shapes. According to an embodiment, each ejection port 509 and the fuel supply manifold 516 associated therewith are sized to deliver a fuel gas stream 526 therefrom at an ejection rate in the range of from about 900 to about 1500 feet per second and will more preferably be sized to a eject fuel gas stream 526 at from about 1,100 to about 1,300 feet per second.

According to an embodiment, the angular orientation of fuel gas streams 526 output from the fuel gas ejectors 506 toward the combustion zone 507 is a function of the height and diameter or width of the burner wall 504, the spacing of fuel gas ejectors 506 from the base 510 of the burner wall 504, the height of the individual fuel gas ejector pipes, etc. However, fuel gas ejectors 506 and the individual fuel gas ports 509 provided therein can be positioned such that each fuel gas free stream 526 in the preheating mode is ejected at an angle in the range of from about 13° to about 26° with respect to the longitudinal axis of the burner 502. Each of the free jet flow streams 526 in the preheat mode is most preferably oriented at an angle of about 18° from longitudinal axis.

Figure 5D:
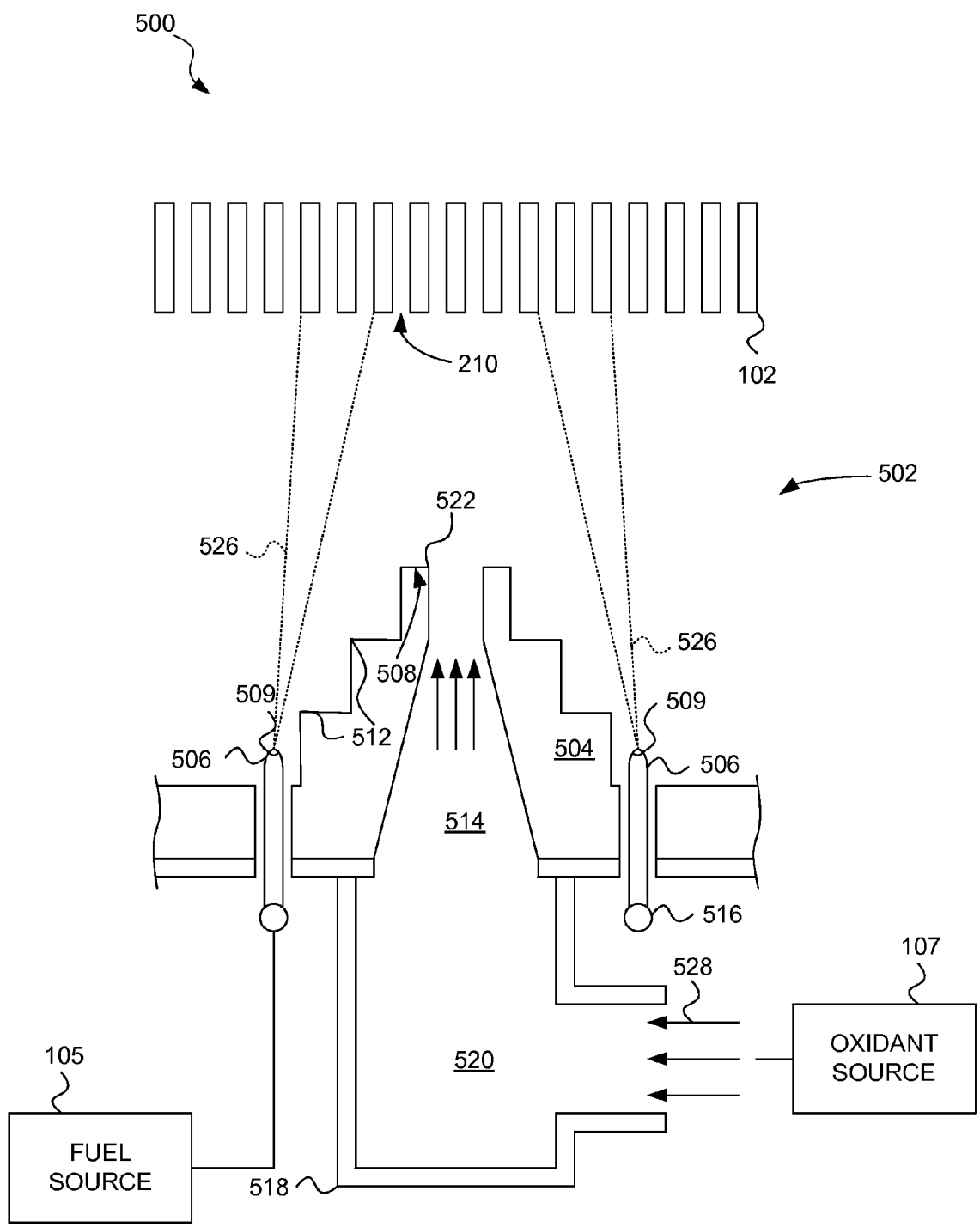
FIG. 5D is a cross sectional view of the burner system of FIG. 5A in a standard operating mode, according to an embodiment.

FIG. 5D is a cross section of the burner system 500 of FIG. 5A in a standard operating mode, according to an embodiment. According to an embodiment, the burner system 500 enters the standard operating mode after the perforated flame holder 102 has been preheated to a threshold temperature as described with relation to FIG. 5C. In the standard operating mode, the burner system 500 supports a combustion reaction of the fuel gas 526 and the combustion air 528 within the perforations 210 of the perforated flame holder 102.

According to an embodiment, one or more of the fuel gas ejectors 506 outputs fuel gas 526 onto the perforated flame holder 102. The one or more fuel gas ejectors 506 that output fuel gas 526 onto the perforated flame holder 102 can include one or more of the same fuel gas ejectors 506 that eject fuel gas 526 for the preheat flame 524 in the preheating mode. Alternatively, the one or more fuel gas ejectors 506 that output fuel gas 526 onto the perforated flame holder 102 can be distinct from the fuel gas ejectors 506 that eject fuel gas 526 for the preheat flame 524. For example, half of the fuel gas ejectors 506 (every other fuel gas ejector 506) as seen in the top view of FIG. 5B can eject fuel gas 526 for the preheat flame 524 and the other half of the fuel gas ejectors 506 can eject fuel gas 526 onto the perforated flame holder 102 in the standard operating mode. Those skilled in the art will understand that other configurations can be used for ejecting fuel gas 526 onto the perforated flame holder 102 and for the preheat flame 524. An such other configurations and schemes fall within the scope of the present disclosure.

The oxidant source 107 supplies oxidant 528, for example combustion air, to the interior passageway 514 via the interior 520 of the housing 518. The oxidant 528 is expelled from the interior passageway 514 via the opening 522 onto the perforated flame holder 102.

In the standard operating mode, the fuel gas 526 and the oxidant 528 combust at the perforated flame holder 102. In particular, the perforated flame holder 102 supports a combustion reaction of the fuel gas 526 and the oxidant 528 within the perforated flame holder 102.

According to an embodiment, the one or more fuel gas ejectors 506 that eject fuel gas 526 onto the perforated flame holder 102 can eject fuel gas 526 as a diverging spray. Alternatively, the one or more fuel gas ejectors 506 that eject fuel gas 526 onto the perforated flame holder 102 can eject fuel gas as a single stream or one or more distinct streams.

According to an embodiment, each of the fuel gas ejectors 506 eject fuel gas 526 in a fixed direction. Alternatively, one or more of the fuel gas ejectors 506 can be controlled to output fuel gas 526 in more than one direction and/or with one or more types of stream. Thus, one or more of the fuel gas ejectors 506 can eject different types of streams and in different directions for different operating modes.

Figure 6A:
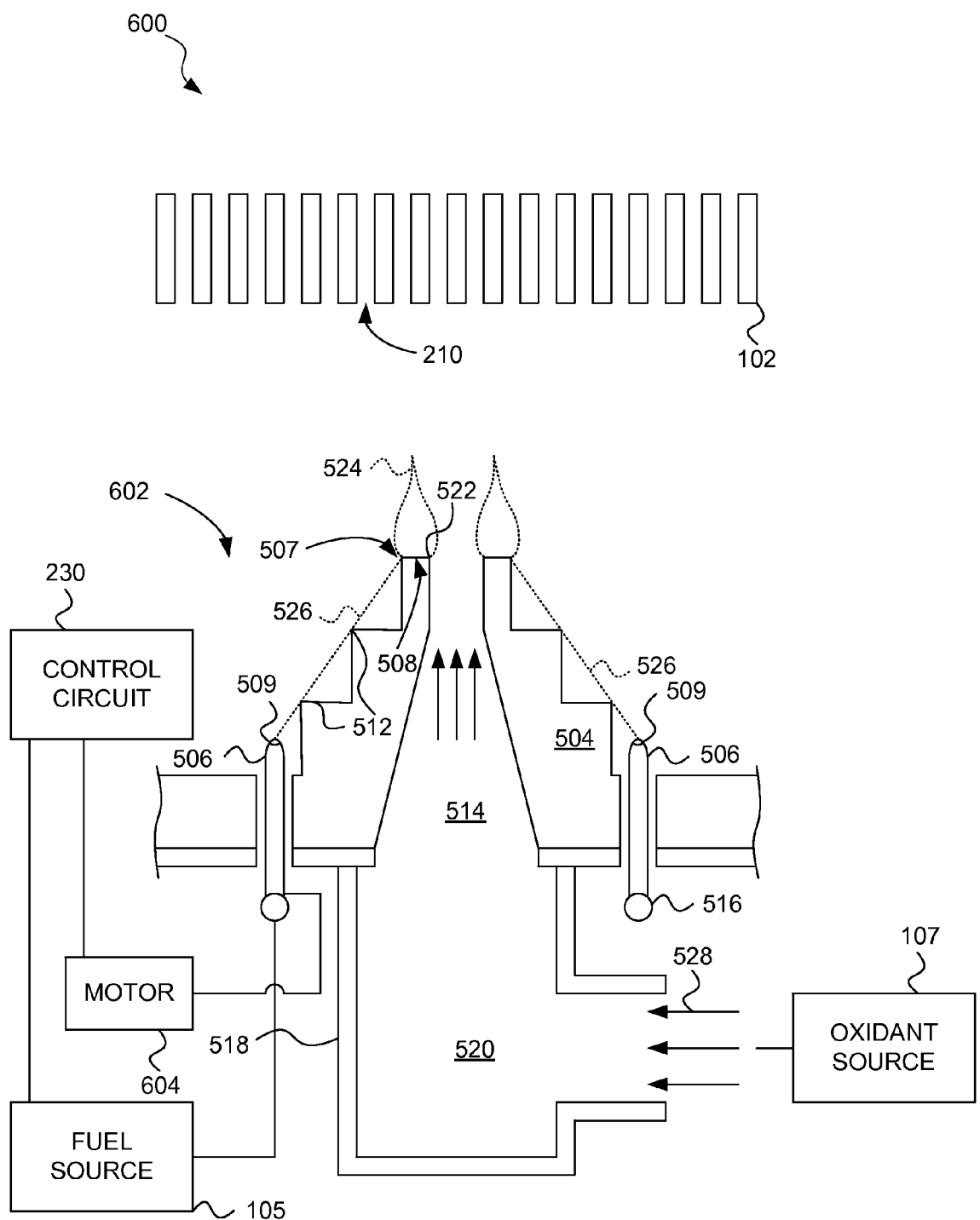
FIG. 6A is a cross sectional view of a burner system in a preheating mode and including a motor, according to an embodiment.

FIG. 6A is a cross section of a burner system 600, according to an embodiment. The burner system 600 includes a burner 602 and a perforated flame holder 102 similar in some to the burner 502 described with respect to FIG. 5A-5D. The burner system 600 of FIG. 6A is operating in a preheating mode in which the burner system 600 supports a preheat flame 524 in a manner similar in some ways to that described with respect to FIG. 5C. In particular, one or more fuel gas ejectors 506 eject fuel gas 526 toward a combustion zone 507 at a forward end 508 of the burner wall 504. Oxidant 528 is supplied to the combustion zone 507 via the interior passageway 514. The preheat flame 524 is the supported by a combustion reaction of the fuel gas 526 and the oxidant 528.

The burner system 600 includes a motor 604 coupled to the fuel gas ejectors 506. A control circuit 230 is coupled to the motor 604 and the fuel source 105. According to an embodiment, the motor 604, under control of the control circuit 230, can adjust the position of one or more of the fuel gas ejectors 506. For example, when the burner system 600 transitions from the preheat mode to the standard operating mode the motor 604 can cause one or more of fuel gas ejectors 506 to adjust their position or orientation such that the one or more fuel gas ejectors 506 eject fuel gas 526 onto the perforated flame holder 102. This repositioning can include raising the one or more fuel gas ejectors 506 so that a fuel stream 526 that previously impinged on the ledges 512 now misses the ledges 512 and the forward end 508 of the burner wall 504 and continues on to the perforated flame holder 102. Alternatively, the repositioning can include adjusting an angle of the fuel gas ejectors 506 so that their streams of fuel gas 526 proceeds to the perforated flame holder 102. The repositioning can also include rotating an angle of a fuel port 509 of the one or more fuel gas ejectors 506 or opening or closing additional fuel gas ports 509 of the fuel gas ejectors 506 to change a trajectory of a spray of fuel gas 526 or to change width of a stream of the fuel gas 526. Those skilled in the art will recognize that there are many other schemes or configurations by which a fuel gas ejector 506 can be adjusted to alter a stream of fuel gas 526. All such other schemes fall within the scope of the present disclosure.

Figure 6B:
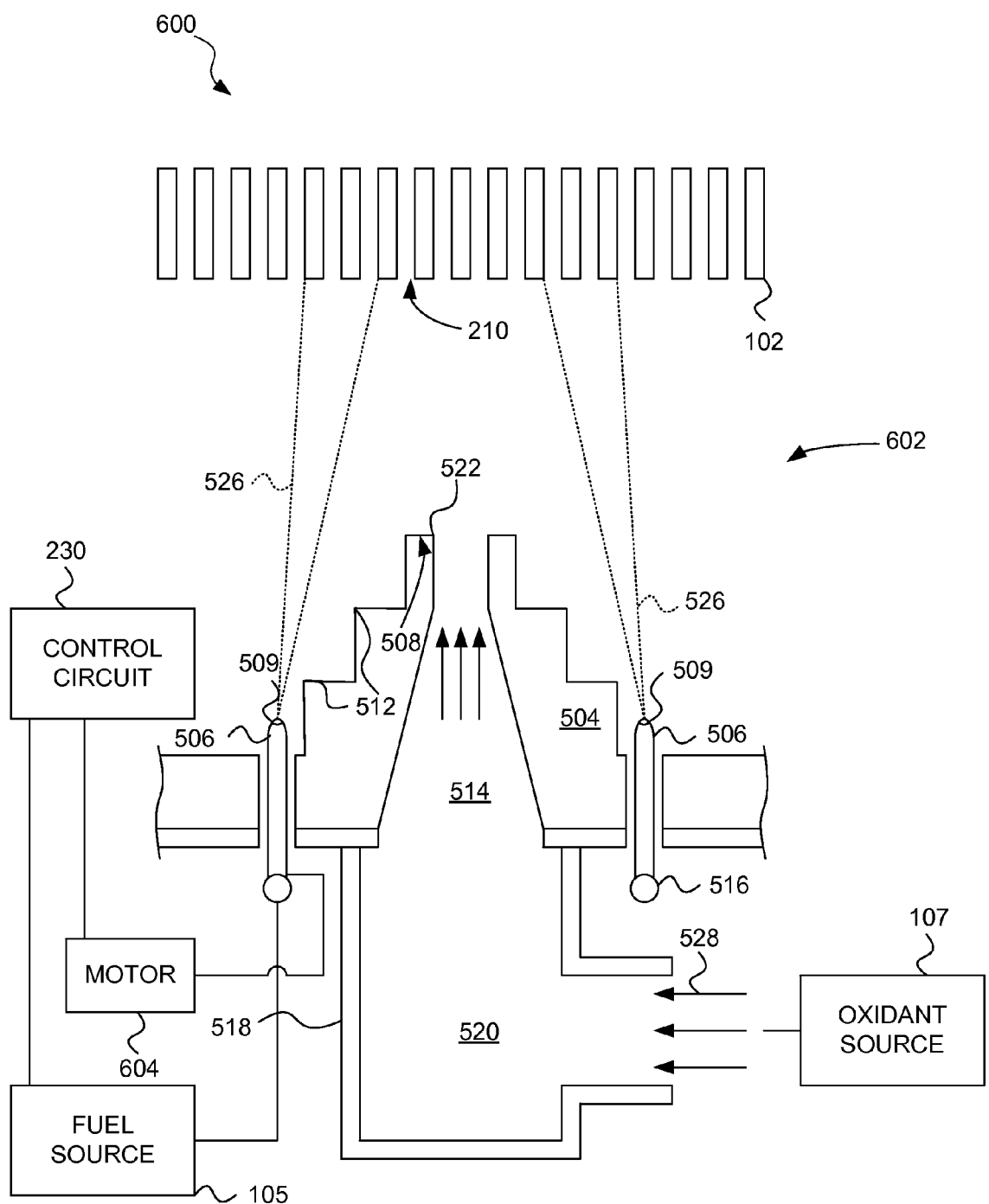
FIG. 6B is a cross sectional view of the burner system of FIG. 6A in a standard operating mode, according to an embodiment.

FIG. 6B is a cross section of the burner system 600 of FIG. 6A in a standard operating mode, according to an embodiment. According to an embodiment, the burner system 600 enters the standard operating mode after the perforated flame holder 102 has been preheated to a threshold temperature by the preheat flame 524 (shown in FIGS. 5C, 6A, and 7A). In the standard operating mode, the burner system 600 supports a combustion reaction of the fuel gas 526 and the combustion air 528 within the perforations 210 of the perforated flame holder 102.

According to an embodiment, the motor 604 has repositioned one or more of the fuel gas ejectors 506 to output fuel gas 526 onto the perforated flame holder 102. As described above in relation to FIG. 6A this repositioning can be accomplished in a large variety of ways.

In the standard operating mode, the fuel gas 526 and the oxidant 528 combust at the perforated flame holder. In particular, the perforated flame holder 102 supports a combustion reaction of the fuel gas 526 and the oxidant 528 within the perforated flame holder 102.

FIG. 7A is a cross section of a burner system 700, according to an embodiment. The burner system 700 includes a burner 702 and a perforated flame holder 102 similar in some to the burner 502 described with respect to FIG. 5A-5D. The burner system 700 of FIG. 7A is operating in a preheating mode in which the burner system 700 supports a preheat flame 524 in a manner similar in some ways to that described with respect to FIG. 5C. In particular, one or more fuel gas ejectors 506 eject fuel gas 526 toward a combustion zone 507 at a forward end 508 of the burner wall 504. Oxidant 528 is supplied to the combustion zone 507 via the interior passageway 514. The preheat flame 524 is supported by a combustion reaction of the fuel gas 526 and the oxidant 528.

The burner system 700 includes a motor 604 coupled to the burner 702, particularly to the housing 518 of the burner 702. A control circuit 230 is coupled to the motor 604 and the fuel source 105.

According to an embodiment, the motor 604, under control of the control circuit 230, can adjust the position of burner to enter or exit the preheating mode. For example, when the burner system 700 transitions from the preheat mode to the standard operating mode the motor 604 can adjust a position of the burner wall 504 with respect to the fuel gas ejectors 506. This repositioning can include lowering the entire burner wall 504 and the housing 518 with respect to the fuel gas ejectors 506. When the burner wall 504 has been lowered (or retracted further behind the furnace wall) the fuel gas 526 no longer impacts the ledges 512 or the forward end of the burner wall 504. Thus, the fuel gas 526 can continue on to the perforated flame holder 102. The burner system 700 can reenter the preheating mode by returning the position of the burner wall 504 to that shown in FIG. 7A.

Figure 7B:
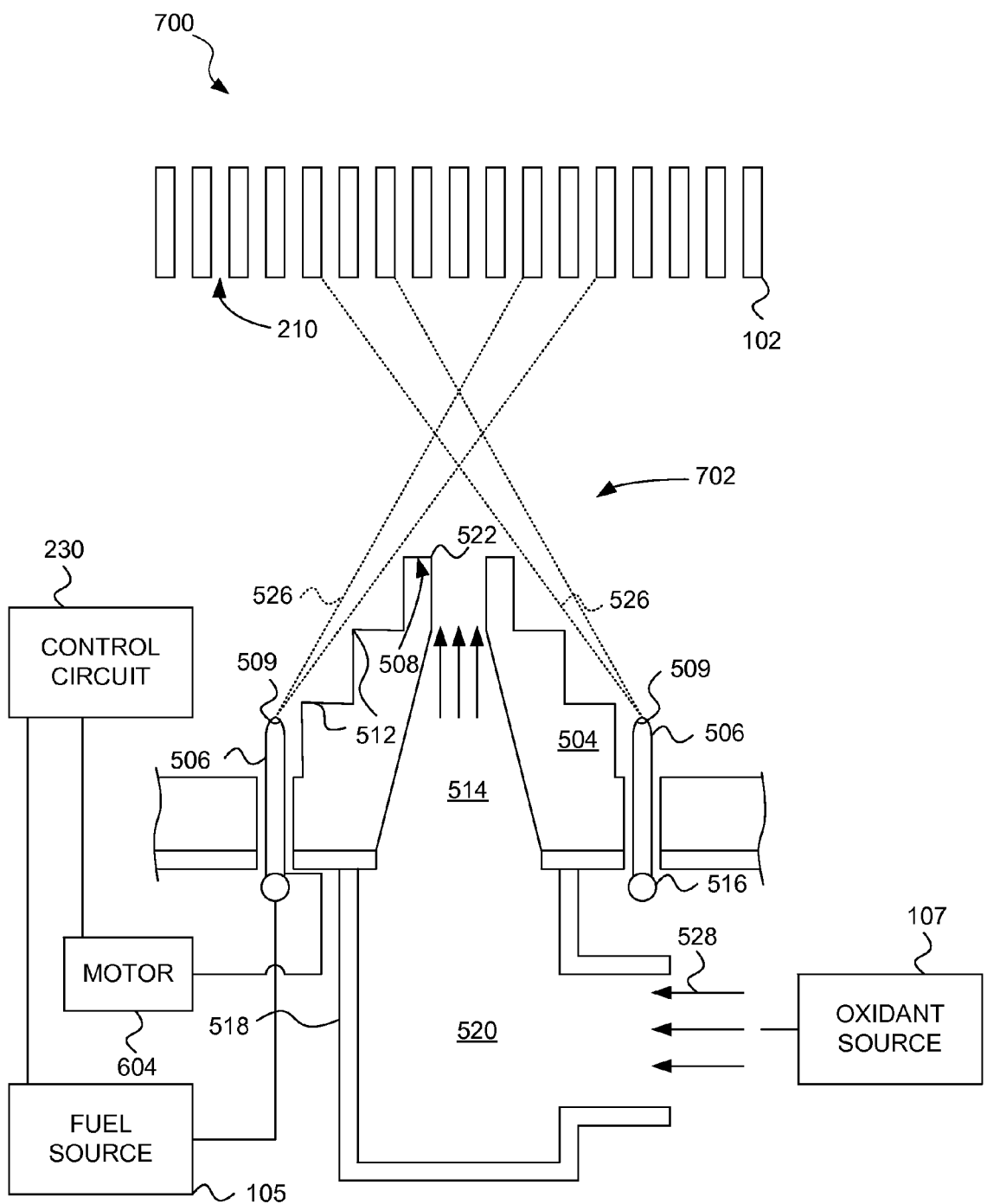
FIG. 7B is a cross sectional view of the burner system of FIG. 7A in a standard operating mode, according to an embodiment.

FIG. 7B is a cross section of the burner system 700 of FIG. 7A in a standard operating mode, according to an embodiment. According to an embodiment, the burner system 700 enters the standard operating mode after the perforated flame holder 102 has been preheated to a threshold temperature by the preheat flame 524 (shown in FIGS. 6A and 7A). In the standard operating mode, the burner system 700 supports a combustion reaction of the fuel gas 526 and the combustion air 528 within the perforations 210 of the perforated flame holder 102.

According to an embodiment, the motor 604 has repositioned the burner wall 504 so that fuel gas 526 output from the one or more of the fuel gas ejectors 506 continues onto the perforated flame holder 102.

In the standard operating mode, the fuel gas 526 and the oxidant 528 combust at the perforated flame holder 102. In particular, the perforated flame holder 102 supports a combustion reaction of the fuel gas 526 and the oxidant 528 within the perforated flame holder 102.

While various aspects and embodiments have been disclosed herein, other aspects and embodiments are contemplated. The various aspects and embodiments disclosed herein are for purposes of illustration and are not intended to be limiting, with the true scope and spirit being indicated by the following claims.

What is claimed is:

1. A burner providing reduced $NO_x$ emissions comprising:
 a burner wall having a forward end;
 at least one first fuel gas nozzle positioned longitudinally rearward of and laterally outward from the forward end of the burner wall;
 at least one fuel gas delivery port positioned in the first fuel gas nozzle to deliver fuel gas in a flow path outside of the burner wall to a combustion zone at the forward end of the burner wall;
 at least one exterior ledge provided on the burner wall and positioned between the fuel gas delivery port and the forward end of the burner wall such that at least a portion of the fuel gas traveling in the flow path will contact the exterior ledge, the exterior ledge being spaced apart from the forward end; and
 a perforated flame holder including:
  an input face proximal to the front end of the burner wall;
  an output face distal from the burner; and
  a plurality of perforations extending between the input and output faces;
 wherein the burner wall and the at least one first fuel gas nozzle are configured to preheat the perforated flame holder to a threshold temperature by supporting a first combustion reaction in the combustion zone; and further comprising
 at least one second fuel gas nozzle configured to output fuel gas onto the perforated flame holder after the perforated flame holder has been heated to the threshold temperature; and further comprising
 a control circuit operatively coupled to the at least one first fuel gas nozzle and the at least one second fuel gas nozzle;
 wherein the control circuit is configured to:
  cause the at least one first fuel gas nozzle to output fuel gas toward the forward end of the burner wall during a preheating phase;
  terminate the preheating phase after the perforated flame holder has reached a threshold temperature; and
  cause the at least one second fuel gas nozzle to output fuel gas onto the perforated flame holder after the preheating phase has been terminated.

2. The burner of claim 1, wherein the exterior ledge is positioned longitudinally rearward of and laterally outward from the forward end of the burner wall.

3. The burner of claim 1, wherein the combustion zone is positioned between the forward end of the burner wall and the perforated flame holder.

4. The burner of claim 1, wherein the at least one first fuel gas nozzle is configured to output fuel gas onto the perforated flame holder after the perforated flame holder has been heated to the threshold temperature, the perforated flame holder being configured to support a combustion reaction of the fuel gas within the apertures.

5. The burner of claim 1, comprising a motor coupled to the at least first one fuel gas nozzle and configured to reposition the at least one fuel gas nozzle to output fuel gas onto the perforated flame holder after the perforated flame holder has been heated to the threshold temperature.

6. The burner of claim 1, comprising:
an opening in the burner wall at the forward end; and
a central channel in the burner wall configured to output an oxidant toward the perforated flame holder.

7. A burner providing reduced NOx emissions for use in a heating system having a flue gas therein, the burner comprising:
a burner wall having a forward end;
a series of first fuel gas ejectors, each having only a single fuel gas ejection port provided therein, the first fuel gas ejectors and the single fuel gas ejection ports provided therein being positioned and the fuel gas ejection ports being configured to deliver fuel gas from the first fuel gas ejectors in a plurality of adjacent free jet flow streams outside of the burner wall toward a combustion zone at the forward end of the burner wall, each of the adjacent free jet flow streams being effective for entraining a portion of the flue gas in the fuel gas and the fuel gas ejection ports being positioned longitudinally rearward and laterally outward with respect to the forward end of the burner wall;
an impact structure positioned between the fuel gas ejection ports and the forward end of the burner wall such that the impact structure will be contacted by at least a portion of the fuel gas traveling in the flow streams; and
a perforated flame holder including:
an input face proximal to the front end of the burner wall;
an output face distal from the burner; and
a plurality of perforations extending between the input and output faces;
wherein the burner wall and the first fuel gas ejectors are configured to preheat the perforated flame holder to a threshold temperature by supporting a first combustion reaction in the combustion zone; and further comprising
at least one second fuel gas ejector configured to output fuel gas onto the perforated flame holder after the perforated flame holder has been heated to the threshold temperature; and
a control circuit operatively coupled to the first fuel gas ejectors and the at least one second fuel gas ejector;
wherein the control circuit is configured to:
cause the first fuel gas ejectors to output fuel gas toward the forward end of the burner wall during a preheating phase;
terminate the preheating phase after the perforated flame holder has reached a threshold temperature; and
cause the at least one second fuel gas ejector to output fuel gas onto the perforated flame holder after the preheating phase has been terminated.

8. The burner of claim 7, wherein the impact structure is an exterior ledge provided on the burner wall.

9. The burner of claim 8, wherein the exterior ledge is spaced longitudinally rearward of and laterally outward from the forward end of the burner wall.

10. The burner of claim 9, wherein:
the burner wall has a longitudinal axis; and
the fuel gas ejection ports are oriented such that the flow streams leave the fuel gas ejection ports at an angle from the longitudinal axis in the range of from about 13° to about 26°.

11. The burner of claim 7, comprising a plurality of the at least one second fuel gas ejector positioned to eject fuel gas onto the perforated flame holder.

12. The burner of claim 11, wherein the second fuel gas ejectors are configured to eject fuel onto the perforated flame holder after the perforated flame holder has been heated to threshold temperature.

13. The burner of claim 12, wherein the first fuel gas ejectors are configured to stop ejecting fuel gas after the perforated flame holder has reached the threshold temperature.

14. The burner of claim 13, wherein the control circuit is configured to control the ejection of fuel from the first and second fuel gas ejectors.

15. The burner of claim 7, comprising a motor coupled to the first fuel gas ejectors and the control circuit, the motor being configured to reposition the first fuel gas ejectors to output fuel gas onto the perforated flame holder after the perforated flame holder has been preheated to the threshold temperature.

16. The burner of claim 15, wherein the motor repositions the first fuel gas ejectors by moving the first fuel gas ejectors closer to the perforated flame holder.

17. The burner of claim 15, wherein the motor repositions the first fuel gas ejectors by adjusting a position of the respective fuel gas ejection ports.

18. A method comprising:
preheating a perforated flame holder to a threshold temperature by:
ejecting fuel gas outside of a burner wall of the burner in free jet flow such that at least a portion of flue gas is entrained in said fuel gas and said fuel gas travels outside of said burner wall to a combustion zone having a beginning end substantially at said forward end of said burner wall;
delivering an oxidant to the combustion zone via an interior passageway of the burner with an outlet at the forward end of the burner; and
supporting a first combustion reaction of the fuel gas and the oxidant in the combustion zone between the forward end of the burner and the perforated flame holder;
terminating the preheating of the perforated flame holder after the perforated flame holder has reached the threshold temperature;
ejecting fuel gas onto the perforated flame holder;
delivering the oxidant to the perforated flame holder via the interior passageway; and
supporting a second combustion reaction of the fuel gas and the oxidant within the perforated flame holder;

wherein the step of ejecting fuel gas outside of the burner wall of the burner in free jet flow further comprises ejecting the fuel gas from at least one first fuel gas ejector;

wherein the step of ejecting fuel gas onto the perforated flame holder further comprises ejecting the fuel gas from at least one second fuel gas ejector configured to output fuel gas onto the perforated flame holder after the perforated flame holder has been heated to the threshold temperature; and further comprising causing the at least one first fuel gas ejector to output fuel gas toward the forward end of the burner wall during a preheating phase; and causing the at least one second fuel gas ejector to carry out the step of ejecting fuel gas onto the perforated flame holder after the preheating has been terminated.

19. The method of claim 18, wherein:

ejecting fuel gas outside of the burner wall includes ejecting fuel gas from a plurality of the first fuel gas ejector; and ejecting fuel gas onto the perforated flame holder includes ejecting fuel gas from a plurality of the second fuel gas ejector.

20. The method of claim 18, wherein ejecting fuel gas outside of the burner wall and ejecting fuel gas onto the perforated flame holder includes ejecting fuel gas from a plurality of fuel gas ejectors.

\* \* \* \* \*